(12) United States Patent
Takeda et al.

(10) Patent No.: US 8,711,487 B2
(45) Date of Patent: Apr. 29, 2014

(54) VIRTUAL IMAGE DISPLAY DEVICE AND MANUFACTURING METHOD OF VIRTUAL IMAGE DISPLAY DEVICE

(75) Inventors: Takashi Takeda, Suwa (JP); Takahiro Totani, Suwa (JP); Masayuki Takagi, Shiojiri (JP); Akira Komatsu, Kamiina-gun (JP); Toshiaki Miyao, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 116 days.

(21) Appl. No.: 13/595,593

(22) Filed: Aug. 27, 2012

(65) Prior Publication Data

US 2013/0070344 A1    Mar. 21, 2013

(30) Foreign Application Priority Data

Sep. 15, 2011    (JP) .................................. 2011-201464

(51) Int. Cl.
*G02B 27/14*    (2006.01)
*G02B 27/01*    (2006.01)

(52) U.S. Cl.
CPC .................................. *G02B 27/0172* (2013.01)
USPC .............................. 359/630; 359/629; 359/633

(58) Field of Classification Search
USPC ........................................ 359/629, 630, 633
See application file for complete search history.

(56) References Cited

U.S. PATENT DOCUMENTS

| 2002/0034016 | A1 | 3/2002 | Inoguchi et al. |
| 2007/0217017 | A1 | 9/2007 | Ichikawa |
| 2010/0164840 | A1 | 7/2010 | Yamamoto |
| 2013/0163089 | A1* | 6/2013 | Bohn ............................ 359/630 |

FOREIGN PATENT DOCUMENTS

| JP | A-2000-249969 | 9/2000 |
| JP | A-2007-240924 | 9/2007 |
| JP | A-2008-172367 | 7/2008 |
| JP | A-2009-51920 | 3/2009 |

* cited by examiner

*Primary Examiner* — William Choi
(74) *Attorney, Agent, or Firm* — Oliff PLC

(57) ABSTRACT

In fabrication of a light guiding unit, a half mirror layer as a reflection film for folding light is covered by a light transmission main body part as a coating member, i.e., a light transmission member, and a hard coating layer is deposited thereon. Therefore, even when the surfaces of a light guide main body part and the light transmission main body part forming the light guiding unit are cleansed as pre-processing of the deposition of the hard coating layer, the situations such that the half mirror layer is separated thereby may be avoided and optical properties of the half mirror layer may not be lost.

13 Claims, 12 Drawing Sheets

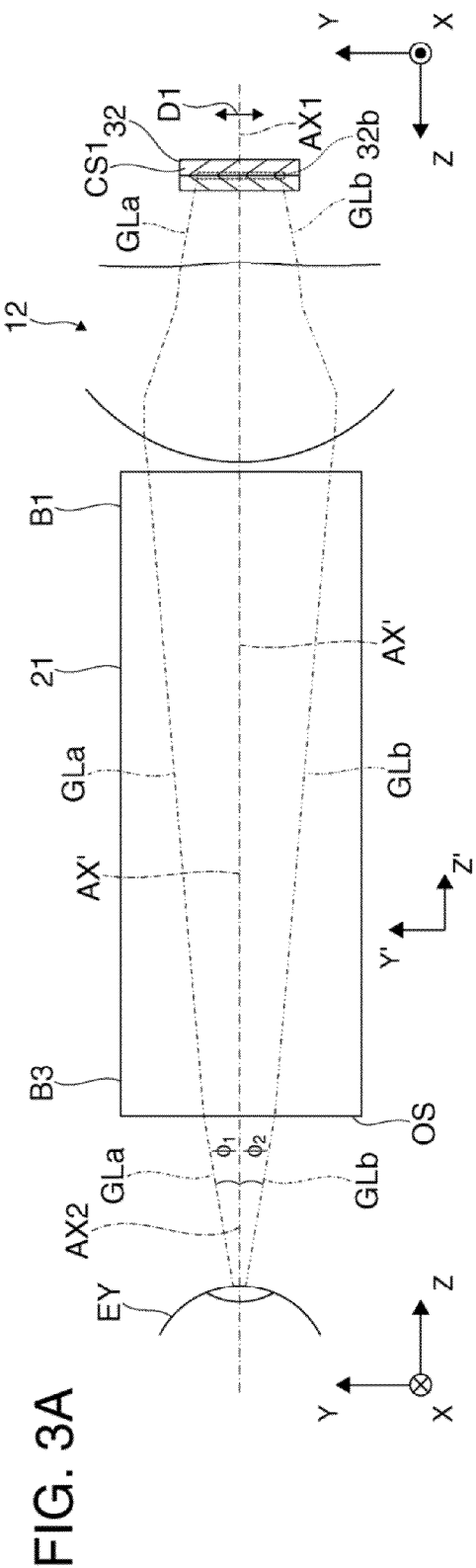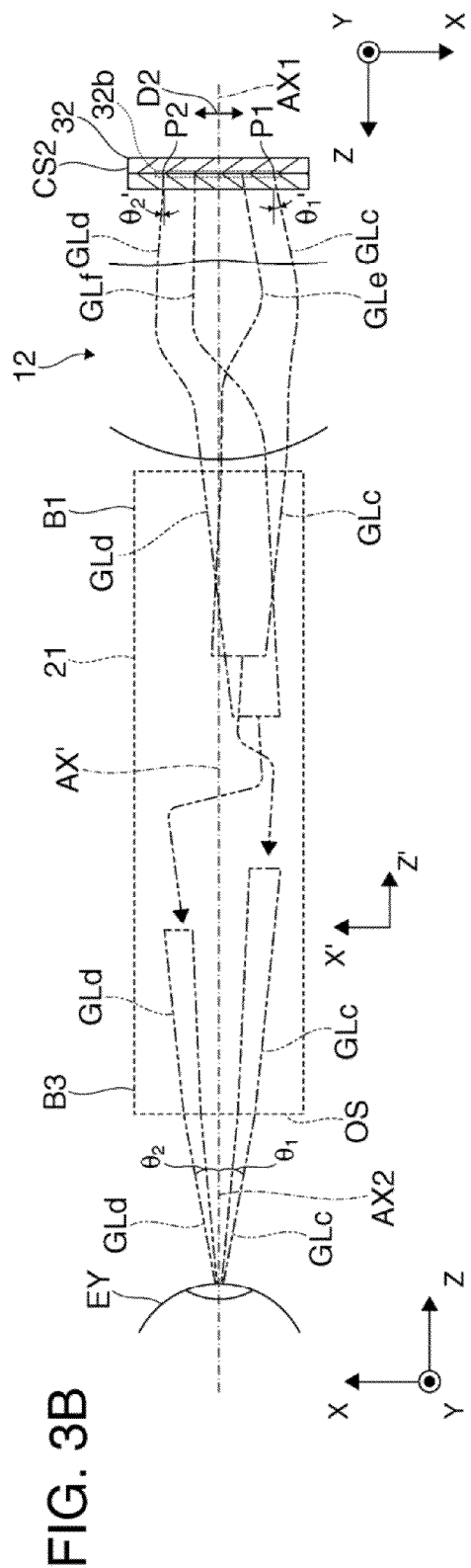

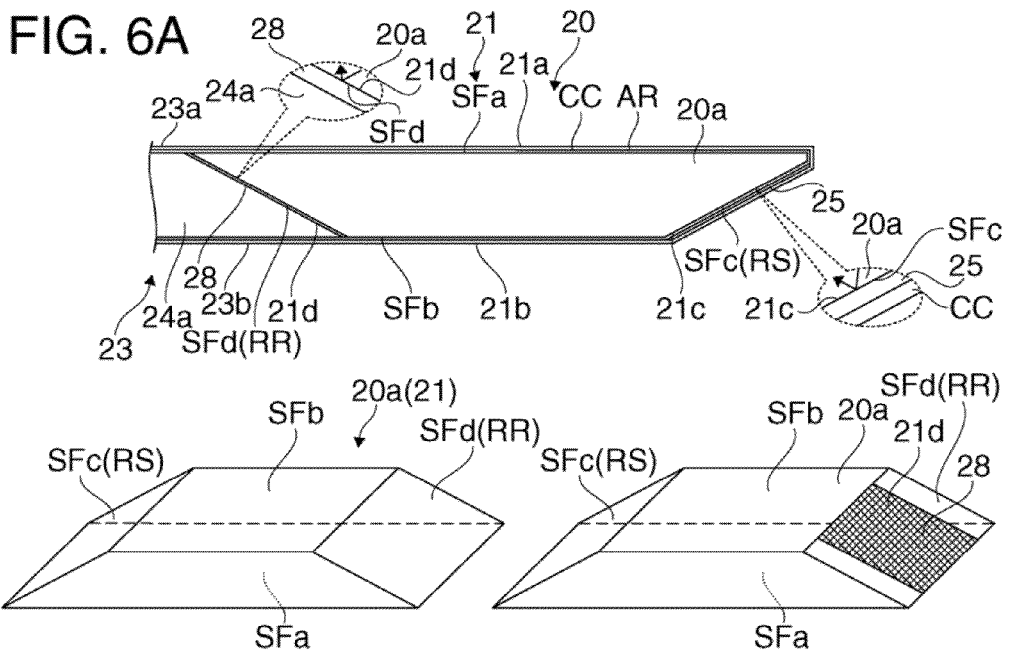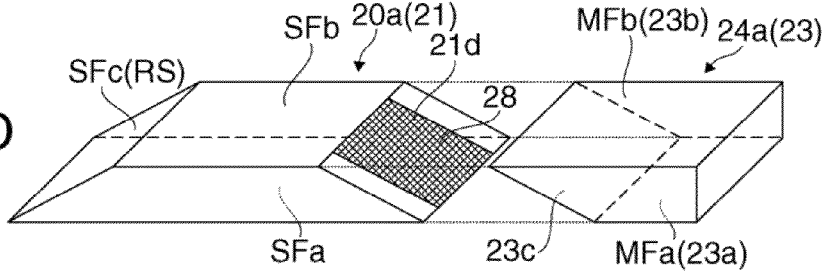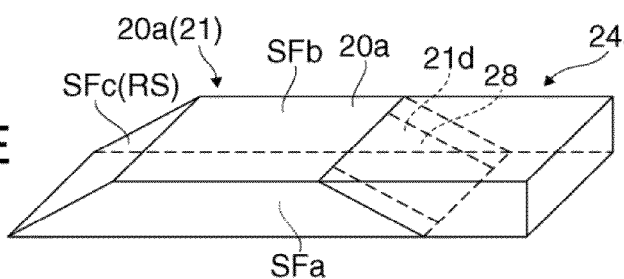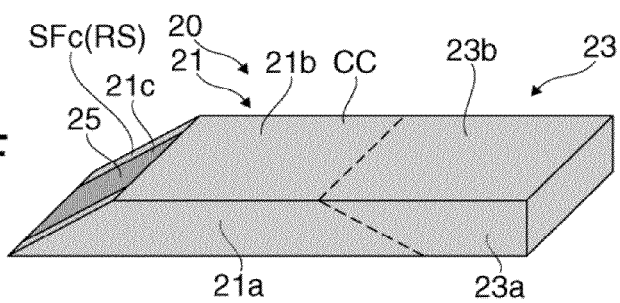

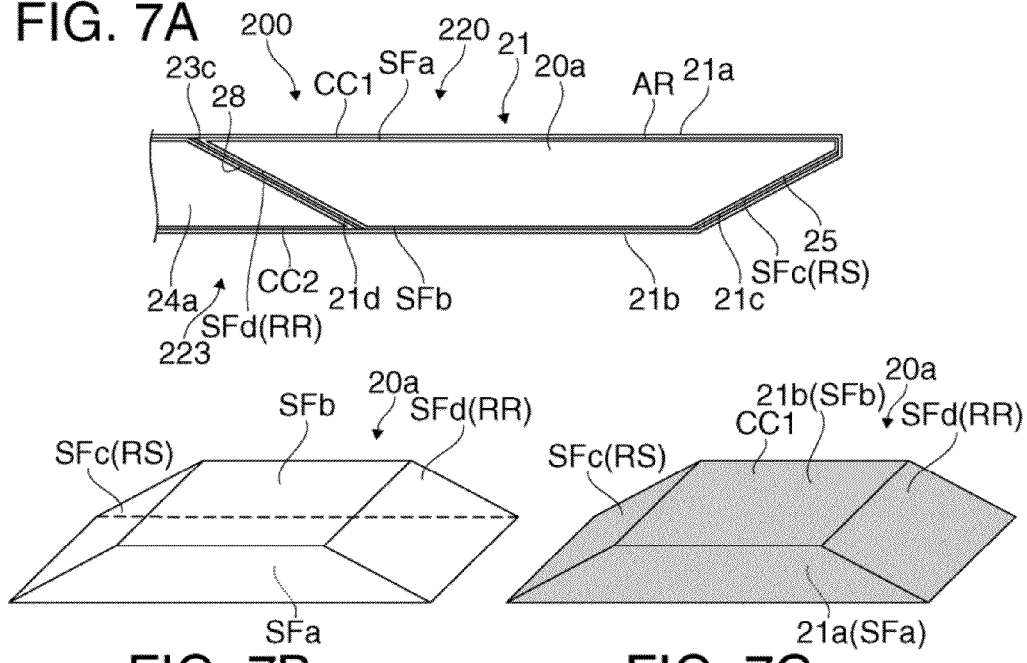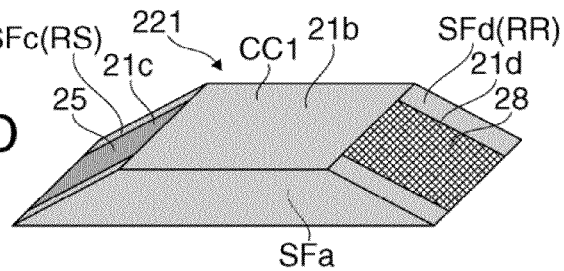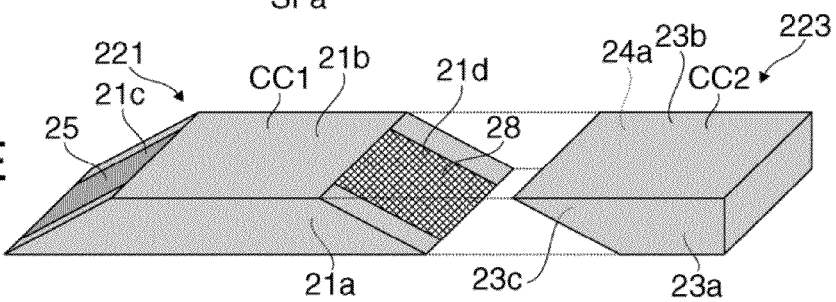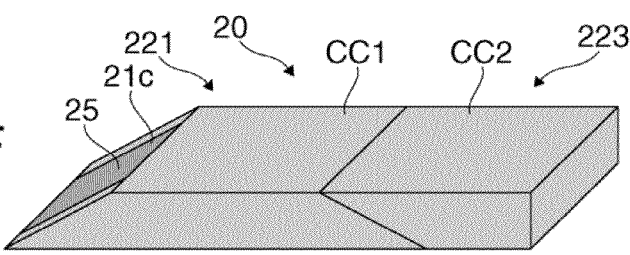

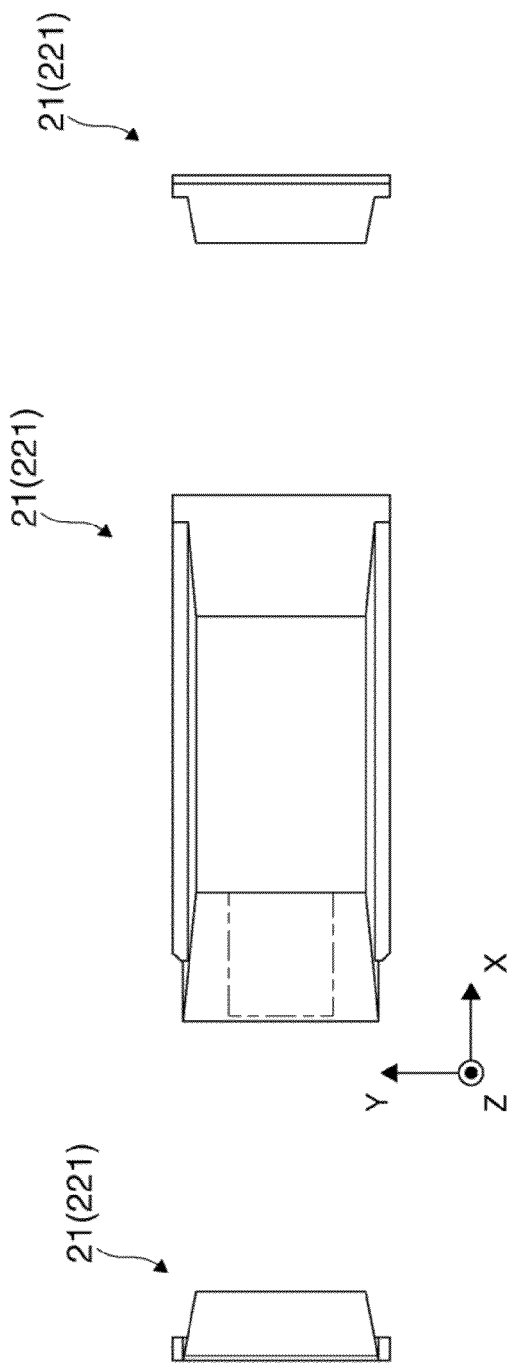

VIRTUAL IMAGE DISPLAY DEVICE AND MANUFACTURING METHOD OF VIRTUAL IMAGE DISPLAY DEVICE

BACKGROUND

1. Technical Field

The present invention relates to a virtual image display device such as a head-mounted display mounted on a head.

2. Related Art

Recently, as virtual image display devices that enable formation and observation of virtual images like head-mounted displays, various devices of a type of guiding image light from a display element to eyes of an observer using a light guide plate have been proposed (see Patent Document 1 (JP-A-2008-172367) and Patent Document 2 (JP-A-2000-249969)). For example, see-through systems that can superimpose image light and external light by incorporating hologram elements in the light guide plates have been proposed (see Patent Document 3 (JP-A-2007-240924)). Further, not for the head-mounted display, a technology of providing a hard coating layer for protection of surfaces of resin molded components has been generally known (see Patent Document 4 (JP-A-2009-51920)).

In the head-mounted display, in order to guide image light in an appropriate condition, it is necessary to keep the surface part of the light guide plate for propagation processing of the image light by reflection or the like in good condition. Therefore, it is conceivable that a hard coating layer is provided for prevention of damage on the surface part and easy removal of soiling on the surface. Particularly, in the case of the see-through head-mounted display, the exposed parts of the light guide plate are likely to increase and provision of the hard coating layer in the surface part becomes more important. Here, in deposition of the hard coating layer, cleansing is generally performed for elimination of fouling in the surface part immediately before deposition.

However, it is necessary to provide various optical elements for guiding light such as the hologram element in Patent Document 3, for example, in the light guide part of the head-mounted display. Accordingly, for example, if cleansing is performed as pre-processing of the deposition of the hard coating layer, the optical elements provided in the light guide part may be separated and otherwise, light guide performance or the like may be deteriorated.

SUMMARY

An advantage of some aspects of the invention is to provide a virtual image display device having a hard coating layer in which damage may be suppressed and soiling on surfaces may be removed and optical properties may be maintained in good condition and a method of manufacturing the virtual image display device.

A virtual image display device according to a first aspect of the invention includes (a) an image display unit that forms image light, (b) a projection system that forms a virtual image by the image light output from the image display unit, and (c) a light guide unit having (c1) a light-incident part that takes the image light that has passed through the projection system inside, (c2) a light guide part that guides the image light taken from the light-incident part by total reflection on first and second surfaces, and (c3) a light-exiting part that takes the image light through the light guide part to the outside, wherein (d) the light guide unit has a reflection part that folds the image light at least in one of the light-incident part and the light-exiting part, a coating member that covers the reflection part, and a hard coating layer that protects the surface guiding the image light including at least first and second total reflection surfaces, and (e) the hard coating layer covers at least the surface guiding the image light of an entire member containing a light guide main body part that forms at least the light-incident part, the light guide part, and the light-exiting part and the coating member coating the reflection part for folding light.

In the virtual image display device, the hard coating layer is deposited under the condition that the reflection part for folding light as the optical element incorporated in the light guide unit for light guide is coated by the coating member. Therefore, even when the surface of the light transmission main body part forming the light guide unit is cleansed as the pre-processing of the deposition of the hard coating layer in the fabrication of the virtual image display device, for example, the situations such that the reflection part for folding light is separated thereby may be avoided and the optical properties of the reflection part may not be lost. According to the configuration, in the virtual image display device, the hard coating layer is provided and damage may be suppressed and soiling on the surfaces may be removed, and the optical properties may be maintained in good condition. Note that the reflection part includes various parts that fold image light and transmit external light. That is, the reflection part includes various semi-transmissive reflection parts not only of a semi-transmissive reflection film formed by deposition of a metal reflection film and a dielectric multilayer film but also of a semi-transmissive member having semi-transmissive reflectivity, a semi-transmissive sheet, a hologram element that acts only on light in a specific wavelength range and transmits light in other wavelength ranges.

In a specific aspect of the invention, the reflection part for folding light is a reflection film that is provided at the light-exiting part side and takes the image light to the outside and transmits the external light. In this case, see-through observation of reflecting image light by the reflection film and transmitting external light may be performed.

In another specific aspect of the invention, the coating member is a light transmission member forming a see-through part that is bonded to the light-exiting part to cover the reflection film and enables observation of external light. In this case, see-through observation without distortion may be performed by the see-through part.

In still another specific aspect of the invention, the light guide unit has a mirror film that is provided on the hard coating layer at the light-incident part side and guides the image light to the light guide part. In this case, the mirror film is formed after deposition of the hard coating layer. Therefore, the mirror film in good condition without influence by cleansing at deposition of the hard coating layer or the like may be deposited.

A virtual image display device according to a second aspect of the invention includes (a) an image display unit that forms image light, (b) a projection system that forms a virtual image by the image light output from the image display unit, and (c) a light guide unit having (c1) a light-incident part that takes the image light that has passed through the projection system inside, (c2) a light guide part that guides the image light taken from the light-incident part by total reflection on first and second surfaces, and (c3) a light-exiting part that takes the image light through the light guide part to the outside, wherein (d) the light guide unit has a hard coating layer that protects the surface guiding the image light including at least the first and second surfaces, and a reflection part that folds the image light at least in one of the light-incident part and the light-exiting part, and (e) the hard coating layer covers at least the surface guiding the image light of an entire member containing a light guide main body part that forms at least the light-incident part, the light guide part, and the light-exiting part, and the reflection part for folding light is formed on the hard coating layer.

In the virtual image display device, after the deposition of the hard coating layer, the reflection part for folding light is formed. Therefore, even when the surface of the light guide main body part forming the light guide unit is cleansed as the pre-processing of the deposition of the hard coating layer in the fabrication of the virtual image display device, for example, the situations such that the reflection part for folding light is separated thereby may not be caused and the optical properties of the reflection part may not be lost. According to the configuration, in the virtual image display device, the hard coating layer is provided and damage may be suppressed and soiling on the surfaces may be removed, and the optical properties may be maintained in good condition.

In a specific aspect of the invention, the reflection part for folding light is a reflection film that is provided at the light-exiting part side and takes the image light to the outside and transmits the external light. In this case, by protecting the reflection film that reflects image light and transmits external light, good see-through observation may be performed.

In another specific aspect of the invention, the light guide unit has a light transmission member forming a see-through part that is bonded to the light-exiting part and enables observation of external light. In this case, see-through observation without distortion may be performed by the see-through part.

In still another specific aspect of the invention, the reflection part for folding light is a mirror film that is provided at the light-incident part side and guides the image light to the light guide part. In this case, by protecting the mirror film, good transmission of image light may be performed.

In yet another specific aspect of the invention, the hard coating layer is formed by application of a coating material using dipping processing. In this case, the influence of the cleansing at the deposition of the hard coating layer or the like may be avoided and the mirror film in good condition may be deposited.

In still yet another specific aspect of the invention, the light guide part has the first surface and the second surface that are provided in parallel to each other and enables light guide by total reflection, the light-incident part has a third surface forming a predetermined angle with respect to the first surface, and the light-exiting part has a fourth surface forming a predetermined angle with respect to the first surface. In this case, image lights after different times of reflection may be simultaneously combined and extracted as image light forming one virtual image, and the larger display size of the virtual image to be observed through the light-exiting part may be secured.

A manufacturing method of the virtual image display device according to the first aspect of the invention includes (a) an image display unit that forms image light, (b) a projection system that forms a virtual image by the image light output from the image display unit, and (c) a light guide unit having (c1) a light-incident part that takes the image light that has passed through the projection system inside, (c2) a light guide part that guides the image light taken from the light-incident part by total reflection on first and second surfaces, (c3) a light-exiting part that takes the image light through the light guide part to the outside, (c4) a reflection part that folds the image light at least in one of the light-incident part and the light-exiting part, (c5) a coating member that covers the reflection part, and (c6) a hard coating layer that protects the surface guiding the image light including at least the first and second surfaces, and the method includes (d) fabricating the reflection part for folding light in a light guide main body part that forms at least one of the light-incident part and the light-exiting part, (e) coating the reflection part fabricated in the fabricating with the coating member, and (f) depositing the hard coating layer that covers an entire member containing the light guide main body part that forms at least the light-incident part, the light guide part, and the light-exiting part and the coating member coating the reflection part for folding light in the coating.

In the manufacturing method of the virtual image display device, the reflection part for folding light fabricated in the fabricating is covered by the coating member in the coating, and the hard coating layer may be deposited in the depositing without influence on the reflection part for folding light. Therefore, in the depositing, even when the surface of the light guide main body part forming the light guide unit is cleansed as the pre-processing of the deposition, the situations such that the reflection part for folding light is separated thereby may be avoided and the optical properties of the reflection part may not be lost. In this manner, in the virtual image display device fabricated by the manufacturing method, the hard coating layer is provided and damage may be suppressed and soiling on the surfaces may be removed, and the optical properties may be maintained in good condition.

A manufacturing method of the virtual image display device according to the second aspect of the invention includes (a) an image display unit that forms image light, (b) a projection system that forms a virtual image by the image light output from the image display unit, and (c) a light guide unit having (c1) a light-incident part that takes the image light that has passed through the projection system inside, (c2) a light guide part that guides the image light taken from the light-incident part by total reflection on first and second surfaces, (c3) a light-exiting part that takes the image light through the light guide part to the outside, (c4) a hard coating layer that protects the surface guiding the image light including at least the first and second surfaces, and (c5) a reflection part that folds the image light at least in one of the light-incident part and the light-exiting part, and the method includes (d) depositing the hard coating layer that covers an entire member containing a light guide main body part that forms at least the light-incident part, the light guide part, and the light-exiting part, and (e) fabricating the reflection part for folding the image light is formed on the light guide main body part forming at least one of the light-incident part and the light-exiting part of the hard coating layer deposited in the depositing.

In the virtual image display device, after the hard coating layer is deposited in the depositing, the reflection part for folding light is formed on the hard coating layer in the fabricating. Therefore, in the depositing, even when the surface of the light guide main body part forming the light guide unit is cleansed as the pre-processing of the deposition of the hard coating layer, the situations such that the reflection part for folding light is separated thereby may not be caused and the optical properties of the reflection part may not be lost. In this manner, in the virtual image display device fabricated by the manufacturing method, the hard coating layer is provided and damage may be suppressed and soiling on the surfaces may be removed, and the optical properties may be maintained in good condition.

In a specific aspect of the invention, the depositing includes applying a coating material to be the hard coating layer by dipping processing. In this case, even when the light guide unit to foe manufactured has a relatively complex shape, the film having a desired thickness may be uniformly deposited.

BRIEF DESCRIPTION OF THE DRAWINGS

The invention will be described with reference to the accompanying drawings, wherein like numbers reference like elements.

FIG. 3A is a conceptual diagram in which optical paths with respect to a longitudinal first direction are developed, and FIG. 3B is a conceptual diagram in which optical paths with respect to a lateral second direction are developed.

FIG. 6A is a sectional view showing a structure of a light guiding unit, FIG. 6B shows a main part of a light guide member, FIG. 6C shows a state provided with a reflection film, FIG. 6D snows a step of bonding the light guide member and a light transmission member, FIG. 6E shows a state in which the light guide member and the light transmission member have been bonded, and FIG. 6F shows a state provided with a hard coating layer and a mirror film.

FIG. 7A is a sectional view showing a structure of a light guiding unit according to a virtual image display device of the second embodiment, FIG. 7B shows a main part of a light guide member, FIG. 7C shows a state provided with a hard coating layer, FIG. 7D shows a state provided with a reflection film and a mirror film, FIG. 7E shows a step of bonding the light guide member and a light transmission member, and FIG. 7F shows a state in which the light guide member and the light transmission member have been bonded.

FIG. 8A is a front view of the light guide member, FIG. 8B is a bottom view of the light guide member, FIG. 8C is a left side view of the light guide member, and FIG. 8D is a right side view of the light guide member.

DESCRIPTION OF EXEMPLARY EMBODIMENTS

First Embodiment

As below, a virtual image display device according to the first embodiment of the invention will be explained in detail with reference to the drawings.

A. Appearance of Virtual Image Display Device

Figure 1:
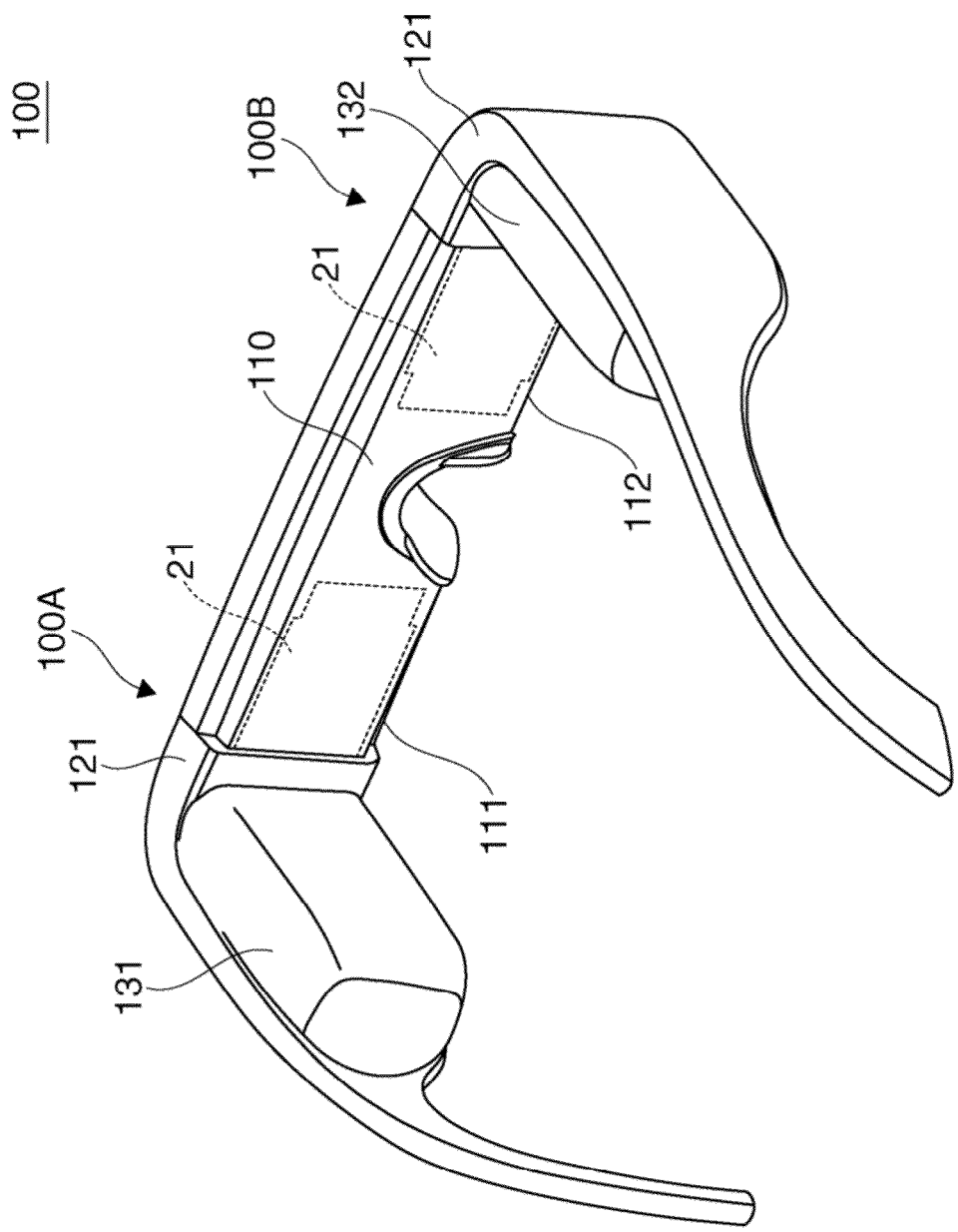
FIG. 1 is a perspective view showing a virtual image display device of an embodiment.

A virtual image display device 100 of the embodiment shown in FIG. 1 is a head-mounted display having an appearance of eyeglasses, and enables an observer wearing the virtual image display device 100 to recognize image light by a virtual image and observe an external image in a see-through manner. The virtual image display device 100 includes an optical panel 110 that covers the view of observer, a frame 121 that supports the optical panel 110, first and second drive parts 131, 132 added to parts from an end piece to a temple of the frame 121. Here, the optical panel 110 has a first panel part 111 and a second panel part 112, and the panel parts 111, 112 are integrally connected at the center to form a plate-like member. A first display unit 100A formed by combining the first panel part 111 on the left in the drawing and the first drive part 131 is a part that forms a virtual image for left eye and functions as a virtual image display device by itself. Further, a second display unit 100B formed by combining the second panel part 112 on the right in the drawing and the second drive part 132 is a part that forms a virtual image for right eye and functions as a virtual image display device by itself.

B. Structure of Display Device

Figure 2A:
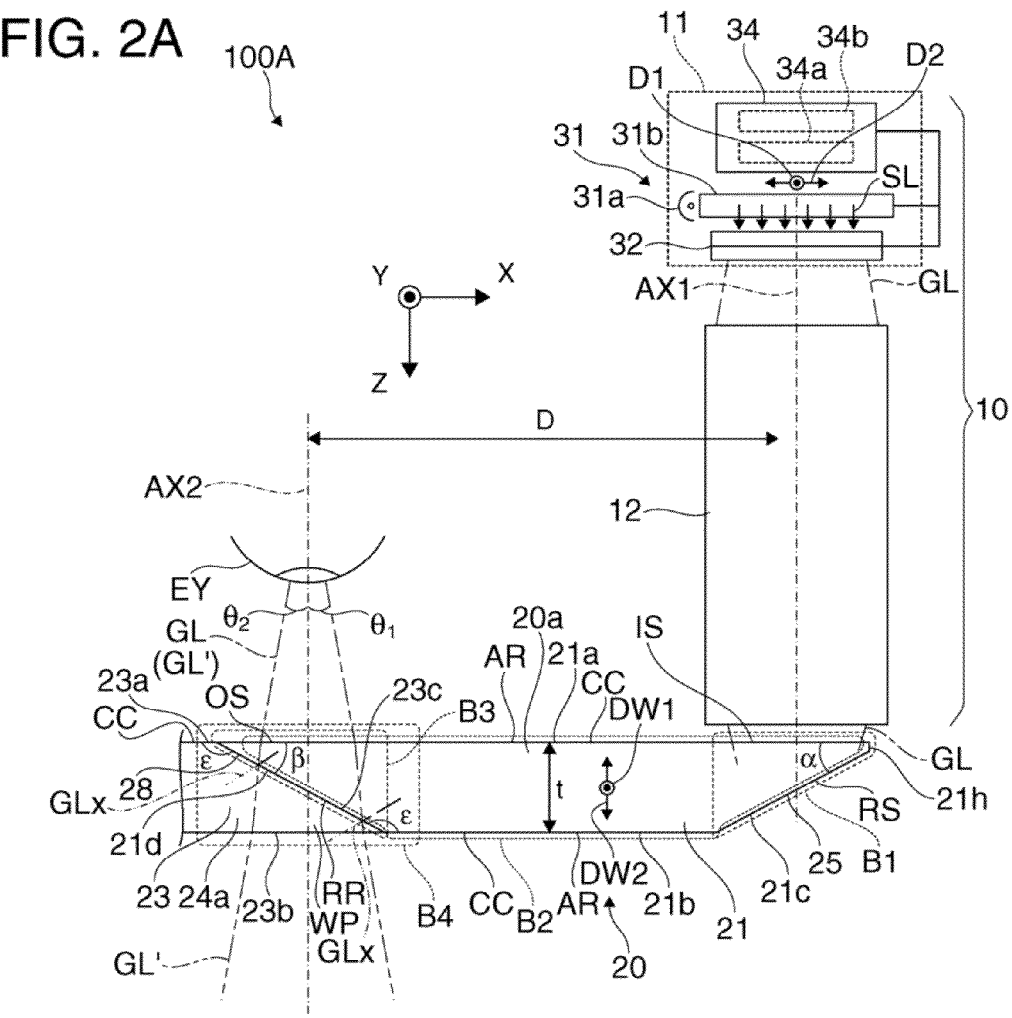
FIG. 2A is a plan view of a main body part of a first display unit forming the virtual image display device.

As shown in FIG. 2A etc., the first display unit 100A includes an image forming device 10 and a light guiding unit 20. Here, the image forming device 10 corresponds to the first drive part 131 in FIG. 1 and the light guiding unit 20 corresponds to the first panel part 111 in FIG. 1. Note that the second display unit 100B shown in FIG. 1 has the same structure as that of the first display unit 100A and just horizontally reversed, and the detailed explanation of the second display unit 100B will be omitted.

The image forming device 10 has an image display unit 11 and a projection system 12. Of them, the image display unit 11 has an illumination device 31 that outputs two-dimensional illumination light SL, a liquid crystal display device 32 as a transmissive spatial light modulation device, and a drive control part 34 that controls the operation of the illumination device 31 and the liquid crystal display device 32.

The illumination device 31 has a light source 31a that generates light containing three colors of red, green, blue, and a backlight light guide part 31b that diffuses the light from the light source 31a into luminous flux having a rectangular section. The liquid crystal display device 32 spatially modulates the illumination light SL from the illumination device 31 and forms image light to be displayed as a moving image or the like. The drive control part 34 includes a light source driver circuit 34a and a liquid crystal driver circuit 34b. The light source driver circuit 34a supplies electric power to the light source 31a of the illumination device 31 and outputs the illumination light SL with stable illuminance. The liquid crystal driver circuit 34b outputs an image signal or a drive signal to the liquid crystal display device 32, and thereby, forms color image light as an original of a moving image or a still image as a transmittance pattern. Note that the liquid crystal driver circuit 34b may be provided with an image processing function, or an external control circuit may be provided with the image processing function. The projection system 12 is a collimator lens that brings the image lights output from the respective points on the liquid crystal display device 32 into parallel luminous fluxes.

In the liquid crystal display device 32, a first direction D1 corresponds to a direction in which a longitudinal section containing a first optical axis AX1 passing through the projection system 12 and a specific line in parallel to a third reflection surface 21c of a light guide member 21, which will be described later, extends, and a second direction D2 corresponds to a direction in which a cross section containing the first optical axis AX1 and the normal line of the third reflection surface 21c extends. That is, in the position of the liquid crystal display device 32, the first direction D1 corresponds to the longitudinal Y direction and the second direction D2 corresponds to the lateral X direction.

The light guiding unit 20 is formed by bonding the light guide member 21 and a light transmission member 23, and forms an optical member having a flat plate shape extending in parallel to the XY plane as a whole.

Of the light guiding unit 20, the light guide member 21 is a trapezoidal prism-like member in the plan view, and has the first reflection surface 21a, a second reflection surface 21b, the third reflection surface 21c, and a fourth reflection surface 21d as a first surface to a fourth surface forming side surfaces. Further, the light guide member 21 has a first side surface (upper surface) 21e and a second side surface (lower surface) 21f adjacent to the first, second, third, and fourth reflection surfaces 21a, 21b, 21c, 21d and opposed to each other. Here, the first and second reflection surfaces 21a, 21b extend along the XY plane and are separated by a thickness t of the light guide member 21. Further, the third reflection surface 21c is tilted at an acute angle α equal to or less than 45° with respect to the XY plane, and the fourth reflection surface 21d is tilted at an acute angle β equal to or less than 45° with respect to the XY plane, for example. The first optical axis AX1 passing through the third reflection surface 21c and the second optical axis AX2 passing through the fourth reflection surface 21d are provided in parallel and separated at a distance D. Note that, as will be described in details, an end surface 21h is provided between the first reflection surface 21a and the third reflection surface 21c to remove an edge. The light guide member 21 has a polyhedral outer shape with seven surfaces including the end surface 21h.

The light guide member 21 guides light using total reflection by the first and second surfaces 21a, 21b as the first and second surfaces oppositely extending to each other, and there are a direction in which the light is folded by reflection when guided and a direction in which the light is not folded by reflection when guided. In consideration of the image guided by the light guide member 21, the lateral direction in which the light is folded by plural times of reflection when guided, i.e., the confinement direction DW2 is perpendicular to the first and second reflection surfaces 21a, 21b (in parallel to the Z-axis), and corresponds to the second direction D2 of the liquid crystal display device 32 when the optical path is developed to the light source side as described below. On the other hand, the longitudinal direction in which the light is not folded and propagates by reflection when guided, i.e., the non-confinement direction DW1 is in parallel to the first and second reflection surfaces 21a, 21b and the third reflection surface 21c (in parallel to the Y-axis) and corresponds to the first direction D1 of the liquid crystal display device 32 when the optical path is developed to the light source side as described below. Note that, in the light guide member 21, the main light guide direction in which the propagated luminous fluxes travel as a whole is −X direction.

The light guide member 21 is formed using a resin material exhibiting high light-transmissivity in the visible range. The light guide member 21 includes a light guide main body part 20a of a block-like member integrally molded by injection molding as a main body part, and the light guide main body part 20a is formed by injecting a heat or photo polymerization resin material into a mold and thermally curing or photo curing the material, for example. As described above, the light guide member 21 has the light guide main body part 20a as an integrally-molded member, but functionally, the part may be divided into a light-incident part B1, a light guide part B2, and a light-exiting part B3.

The light-incident part B1 is a triangular prism-like part, and has a light-incident surface IS as a part of the first reflection surface 21a and the third surface 21c opposed to the light-incident surface IS. The light-incident surface IS is a surface at the rear side or the observer's side for taking in the image light GL from the image forming device 10, and extends to face the projection system 12 perpendicularly to its first optical axis AX. The third reflection surface 21c has a rectangular profile and the entire rectangular region reflects the image light GL that has passed through the light-incident surface IS and guides it into the light guide part B2. For formation of the third reflection surface 21c, a mirror layer 25 (mirror film) for reflection is formed in the light-incident part B1. The mirror layer 25 is formed by forming a film on a slope RS of the light guide main body part 20a of the light guide member 21 by evaporation of aluminum or the like. The third reflection surface 21c is tilted at the acute angle α=25° to 27°, for example, with respect to the first optical axis AX1 of the projection system 12 or the XY plane, folds the image light GL that has entered from the light-incident surface IS toward the +Z direction as a whole in the −X direction near the −Z direction as a whole, and thereby, reliably couples the image light GL within the light guide part B2. Note that the mirror layer 25 is formed by deposition of aluminum or the like to be superimposed on the surface to be the third reflection surface 21c so that external light or the like may not be transmitted or enter the light-incident part B1.

The light guide part B2 has the first reflection surface 21a and the second reflection surface 21b that respectively totally reflect the image lights that have been folded in the light-incident part B1 as two surfaces opposed to each other and extending in parallel to the XY plane. That is, the first and second reflection surfaces 21a, 21b are defined by interfaces between the light guide part B2 and the external air layer and guides light with high efficiency utilizing the refraction index difference at the interfaces unlike the mirror layer 25 and the half mirror layer 26 described later. The distance between the first and second reflection surfaces 21a, 21b, i.e., the thickness t of the light guide member 21 is set to about 9 mm, for example. Here, the first reflection surface 21a is located at the rear side or the observer's side near the image forming device 10, and the second reflection surface 21b is located at the front side or the external side far from the image forming device 10. In this case, the first reflection surface 21a is a surface part in common with the light-incident surface IS and a light-exiting surface OS, which will be described later. The first and second reflection surfaces 21a, 21b are total reflection surfaces using refractive index differences, and provided with no reflection coatings such as mirror layers, but coated with hard coating layers CC as surface coating layers for prevention of damage on the surfaces and prevention of reduction of resolution of images. In principle, the hard coating layers CC form the exposed uppermost surfaces, however, if necessary, the hard coating layers CC may be further coated with antireflection coatings AR as shown in the drawings. In this case, the antireflection coating AR prevents reflection on the surface and functions as a multi-coating that further improves the performance as the hard coating in cooperation with the hard coating layer CC, for example.

The image light GL reflected by the third reflection surface 21c of the light-incident part B1 first enters the first reflection surface 21a and is totally reflected. Then, the image light GL enters the second reflection surface 21b and is totally reflected. Subsequently, the operation is repeated, and the image light is guided in the main light guide direction toward the deeper side of the light guiding unit 20, i.e., the +Z side at which the light-exiting part B3 is provided. Note that, since the first and second reflection surfaces 21a, 21b are provided with no reflection coatings, the external light or outside light entering the second reflection surface 21b from the external side is transmitted through the light guide part B2 at high transmittance. That is, the light guide part B2 is of a see-through type that enables see-through observation of an external image.

The light-exiting part B3 is a triangular prism-like part, and has the light-exiting surface OS as a part of the first reflection surface 21a and the fourth reflection surface 21d opposed to the light-exiting surface OS. The light-exiting surface OS is a surface at the rear side for outputting the image light GL toward an eye EY of the observer, forms a part of the first reflection surface 21a like the light-incident surface IS, and extends perpendicularly to the second optical axis AX2. The distance D between the second optical axis AX2 passing through the light-exiting part B3 and the first optical axis AX1 passing through the light-incident part B1 is set to 50 mm, for example, in consideration of the width of the head of the observer or the like. The fourth reflection surface 21d is a rectangular flat surface that reflects the image light GL that has entered through the first and second reflection surfaces 21a, 21b and outputs the light to the outside of the light-exiting part B3, and transmits external light. For formation of the fourth reflection surface 21d, the half mirror layer 28 as a reflection part (semi-transmissive reflection part) is formed in the light-exiting part B3. That is, the half mirror layer 28 is a light folding reflection film for folding image light and a semi-transmissive reflection film having light-transmissivity that transmits external light. The half mirror layer (semi-transmissive reflection film) 28 is formed by deposition of a metal reflection film of silver or the like and a dielectric multilayer film, for example, to be superimposed on a slope RR forming the fourth reflection surface 21d of the light guide member 21. Note that a light transmission member 23, which will be described later, is provided on the half mirror layer 28 and enables see-through observation. The reflectance of the half mirror layer 28 for the image light GL is set from 10% to 50% in the assumed incident angle range of the image light GL in view of facilitation of see-through observation of external light GL'. The reflectance of the half mirror layer 28 for the image light GL in a specific working example is set to 20%, for example, and the transmittance for the image light GL is set to 80%, for example.

The fourth reflection surface 21d is tilted at the acute angle α=25° to 27°, for example, with respect to the second optical axis AX2 perpendicular to the first reflection surface 21a or the XY plane, partially reflects the image light GL that has entered through the first and second reflection surfaces 21a, 21b of the light guide part B2 by the half mirror layer 28 and folds the light toward the –Z direction as a whole, and thereby, allows the light to pass through the light-exiting surface OS. Further, the fourth reflection surface 21d is also a surface that partially transmits the external light GL' and allows the light to pass through the light-exiting surface OS and a semi-transmissive semi-reflective surface. Note that the component of the image light GL that has transmitted through the fourth reflection surface 21d enters the light transmission member 23 and is not used for formation of images.

The light transmission member 23 is formed using the same material with the same refractive index as those of the main body of the light guide member 21, and has a first surface 23a, a second surface 23b, and a third surface 23c. The first and second surfaces 23a, 23b extend along the XY plane. Further, the third surface 23c is tilted with respect to the XY plane and provided to be opposed and in parallel to the fourth reflection surface 21d of the light guide member 21. That is, the light transmission member 23 has a wedge-shaped member sandwiched between the second surface 23b and the third surface 23c. The light transmission member 23 is formed using a resin material exhibiting high light-transmissivity in the visible range like the light guide member 21. The light transmission member 23 is a block-like member integrally molded by injection molding, and formed by injecting a heat or photo polymerization resin material into a mold and thermally curing it or photo curing it, for example. Note that, on the surface of the light transmission member 23, the hard coating layer CC is provided in common with the light guide member 21.

In the light transmission member 23, the first surface 23a is provided on the extension surface of the first reflection surface 21a provided on the light guide member 21 and located at the rear side near the eye EY of the observer, and the second surface 23b is provided on the extension surface of the second reflection surface 21b provided on the light guide member 21 and located at the front side far from the eye EY of the observer. The third surface 23c is a rectangular light transmission surface bonded to the fourth reflection surface 21d of the light guide member 21 using an adhesive. The angle formed by the first surface 23a and the third surface 23c is equal to the angle ∈ formed by the second reflection surface 21b and the fourth reflection surface 21d of the light guide member 21, and the angle formed by the second surface 23b and the third surface 23c is equal to the angle β formed by the first reflection surface 21a and the third reflection surface 21c of the light guide member 21.

The light transmission member 23 and the light guide member 21 form a see-through part B4 in or near the bonding part of them. That is, the first and second surfaces 23a, 23b are provided with no reflection coatings such as mirror layers, and transmit the external light GL' at high transmittance like the light guide part B2 of the light guide member 21. Also, the third surface 23c can transmit the external light GL' at nigh transmittance, however, because the fourth reflection surface 21d of the light guide member 21 has the half mirror layer 28, the external light GL' passing through the third surface 23c is reduced by 20%, for example. That is, the observer observes superimposition of the image light GL reduced to 20% and the external light GL' reduced to 80%.

Here, the hard coat layers CC coating the exposed surfaces of the light guiding unit 20 are elements forming the surfaces of the bonded light guide member 21 and light transmission member 23, and formed, after bonding of the light guide main body part 20a of the light guide member 21 and a light transmission main body part 24a of the light transmission member 23, by deposition of a hard coating agent of various resin materials collectively on the surfaces of the parts. More specifically, the hard coating layers CC cover the entire member as integration of the light guide main body part 20a containing parts to be the light-incident part B1, the light guide part B2, and the light-exiting part B3 and the light transmission main body part 24a bonded to the light guide main body part 20a to cover the half mirror layer 28 deposited at the light guide main body part 20a side of the light guiding unit 20. Thereby, the hard coating layers CC fulfill a function of preventing damage and facilitating removal of soiling by covering the surfaces that contribute to light guide such as the first and second reflection surfaces 21a, 21b. Especially, in the type having the see-through part B4 like the virtual image display device 100, it is important to provide hard coating for securing good see-through observation, however, in deposition of the hard coating of the fabrication of the virtual image display device 100, cleansing before deposition is necessary for securing the performance. On the other hand, optical elements of the half mirror layer 28 etc. are provided on the light guide member 21 etc. forming the virtual image display device 100, and if cleansing or the like is performed, performance of the optical elements may be deteriorated. In the embodiment, at deposition of the hard coating layers CC, the half mirror layer 28 is covered and protected by the light transmission main body part 24*a* as a coating member, and thereby, the layer may not be affected by the cleansing or the like.

C. Outline of Optical Paths of Image Lights

FIG. 3A is a diagram for explanation of optical paths in the first direction D1 corresponding to the longitudinal section CS1 of the liquid crystal display device 32. In the longitudinal section along the first direction D1, i.e., the YZ plane (the Y'Z' plane after development), of the image lights output from the liquid crystal display device 32, a component output from the upper end side (+Y side) of a display area 32*b* shown by dashed-dotted lines in the drawing is referred to as image light GLa and a component output from the lower end side (−Y side) of the display area 32*b* shown by dashed-two dotted lines in the drawing is referred to as image light GLb.

The upper image light GLa is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\phi_1$ from the upper side. On the other hand, the lower image light GLb is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\phi_2$ ($|\phi_2|=|\phi_1|$) from the lower side. The above described angles $\phi_1$, $\phi_2$ correspond to upper and lower half angles of view, and are set to 6.5°, for example.

FIG. 3B is a diagram for explanation of optical paths in the second direction (confinement direction or combination direction) D2 corresponding to the cross section CS2 of the liquid crystal display device 32. In the cross section CS2 along the second direction (confinement direction or combination direction) D2, i.e., the XZ plane (the X'Z' plane after development), of the image lights output from the liquid crystal display device 32, a component output from a first display point P1 at the right end side (+X side) toward the display area 32*b* shown by dashed-dotted lines in the drawing is referred to as image light GLc and a component output from a second display point P2 at the left end side (−X side) toward the display area 32*b* shown by dashed-two dotted lines in the drawing is referred to as image light GLd. In FIG. 3B, for reference, image light GLe output from, the rightward inner side and image light GLf output from the leftward inner side are added.

The image light GLc from the first display point P1 on the right is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\theta_1$ from the right side. On the other hand, the image light GLd from the second display point P2 on the left is brought into parallel luminous flux by the projection system 12, passes through the light-incident part B1, the light guide part B2, and the light-exiting part B3 of the light guide member 21 along the developed optical axis AX', and enters the eye EY of the observer as parallel luminous flux at a tilt of an angle $\theta_2$ ($|\theta_2|=|\theta_1|$) from the left side. The above described angles $\theta_1$, $\theta_2$ correspond to right and left half angles of view, and are set to 10°, for example.

Note that, regarding the lateral direction of the second direction D2, the image lights GLc, GLd are folded by reflection in the light guide member 21 and the numbers of reflections are different, and the respective image lights GLc, GLd are discontinuously illustrated in the light guide member 21. Further, regarding the eye EY of the observer, the direction of view is vertically inverted compared to that in the case of FIG. 2A. As a result, regarding the lateral direction, the screen is horizontally reversed as a whole, however, by processing the light guide member 21 with high accuracy in a manner, which will be described later in detail, the right-half image of the liquid crystal display device 32 and the left-half image of the liquid crystal display device 32 are continuously and seamlessly joined. Note that, in consideration of the different numbers of times of reflection of the image lights GLc, GLd within the light guide member 21 from each other, the output angle $\theta_1'$ of the right image light GLc and the output angle $\theta_2'$ of the left image light GLd are set to different angles.

According to the above described configuration, the image lights GLa, GLb, GLc, GLd entering the eye EY of the observer are virtual images from infinity. With respect to the longitudinal first direction D1, the image formed on the liquid crystal display device 32 is erected and, with respect to the lateral second direction D2, the image formed on the liquid crystal display device 32 is inverted.

D. Optical Paths of Image Lights with Respect to Lateral Direction

Figure 4:
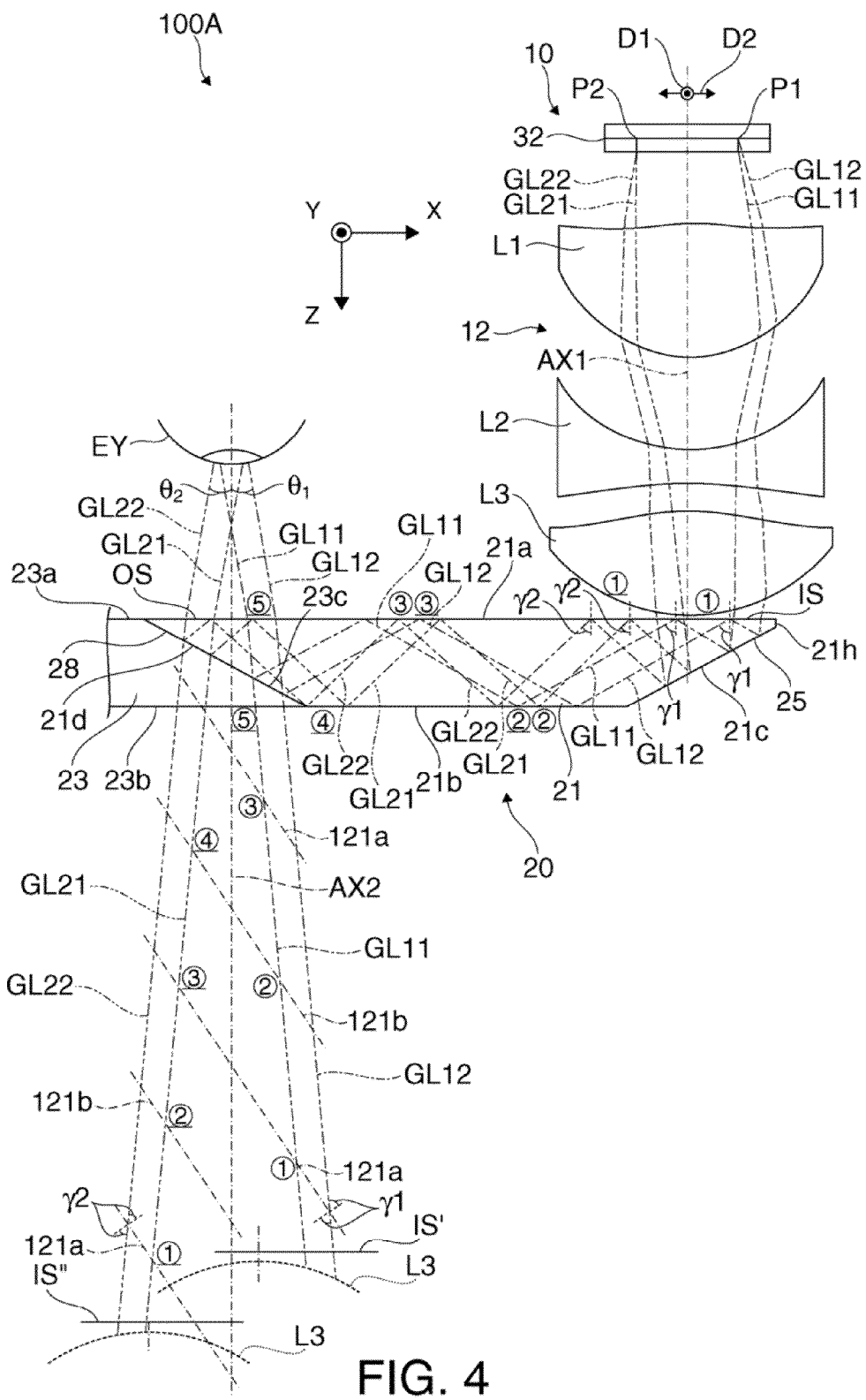
FIG. 4 is a plan view for specific explanation of optical paths in an optical system of the virtual image display device.

FIG. 4 is a sectional view for explanation of specific optical paths in the first display unit 100A. The projection system 12 has three lenses L1, L2, L3.

The image lights GL11, GL12 from the first display point P1 on the right of the liquid crystal display device 32 pass through the lenses L1, L2, L3 of the projection system 12 into parallel luminous fluxes, and enter the light-incident surface IS of the light guide member 21. The image lights GL11, GL12 that have been guided into the light guide member 21 are repeatedly totally reflected at equal angles on the first and second reflection surfaces 21*a*, 21*b*, and finally output as parallel luminous fluxes from the light-exiting surface OS. Specifically, the image lights GL11, GL12 are reflected by the third reflection, surface 21*c* of the light guide member 21 as parallel luminous fluxes, and then, enter the first reflection surface 21*a* of the light guide member 21 at a first reflection angle $\gamma 1$ and are totally reflected (the first total reflection). Then, the image lights GL11, GL12 enter the second reflection surface 21*b* with the first reflection angle $\gamma 1$ held and are totally reflected (the second total reflection), and then, enter the first reflection surface 21*a* again and are totally reflected (the third total reflection). As a result, the image lights GL11, GL12 are totally reflected by the first and second reflection surfaces 21*a*, 21*b* at three times in total, and enter the fourth reflection surface 21*d*. The image lights GL11, GL12 are reflected by the fourth reflection surface 21*d* at the same angle as that by the third reflection surface 21*c*, and output from the light-exiting surface OS as parallel luminous fluxes at the tilt of the angle $\theta_1$ with respect to the second optical axis AX2 perpendicular to the light-exiting surface OS.

The image lights GL21, GL22 from the second display point P2 on the left of the liquid crystal display device 32 pass through the lenses L1, L2, L3 of the projection system 12 into parallel luminous fluxes, and enter the light-incident surface IS of the light guide member 21. The image lights GL21, GL22 that have been guided into the light guide member 21 are repeatedly totally reflected at equal angles on the first and second reflection surfaces 21a, 21b, and finally output as parallel luminous fluxes from the light-exiting surface OS. Specifically, the image lights GL21, GL22 are reflected by the third reflection surface 21c of the light guide member 21 as parallel luminous fluxes, then, enter the first reflection surface 21a of the light guide member 21 at a second reflection angle γ2 (γ2<γ1), and are totally reflected (the first total reflection). Then, the image lights GL21, GL22 enter the second reflection surface 21b with the second reflection angle γ2 held and are totally reflected (the second total reflection), enter the first reflection surface 21a again and are totally reflected (the third total reflection), enter the second reflection surface 21b again and are totally reflected (the fourth total reflection), and enter the first reflection surface 21a again and are totally reflected (the fifth total reflection). As a result, the image lights GL21, GL22 are totally reflected by the first and second reflection surfaces 21a, 21b at five times in total, and enter the fourth reflection surface 21d. The image lights GL21, GL22 are reflected by the fourth reflection surface 21d at the same angle as that by the third reflection surface 21c, and output from the light-exiting surface OS as parallel luminous fluxes at the tilt of the angle $\theta_2$ with respect to the second optical axis AX2 perpendicular to the light-exiting surface OS.

In FIG. 4, a hypothetical first surface 121a corresponding to the first reflection surface 21a when the light guide member 21 is developed and a hypothetical second surface 121b corresponding to the second reflection surface 21b when the light guide member 21 is developed are illustrated. According to the development, it is known that the image lights GL11, GL12 from the first display point P1 pass through an incident equivalent surface IS' corresponding to the light-incident surface IS, then, pass through the first surface 121a twice, pass through the second surface 121b once, are output from the light-exiting surface OS, and enter the eye EY of the observer, and the image lights GL21, GL22 from the second display point P2 pass through an incident equivalent surface IS" corresponding to the light-incident surface IS, then, pass through the first surface 121a at three times, pass through the second surface 121b twice, are output from the light-exiting surface OS, and enter the eye EY of the observer. From a different point of view, the observer observes superimposition of the lenses L3 of the projection system 12 existing near the incident equivalent surfaces IS', IS" in the two different positions.

Figure 5A:
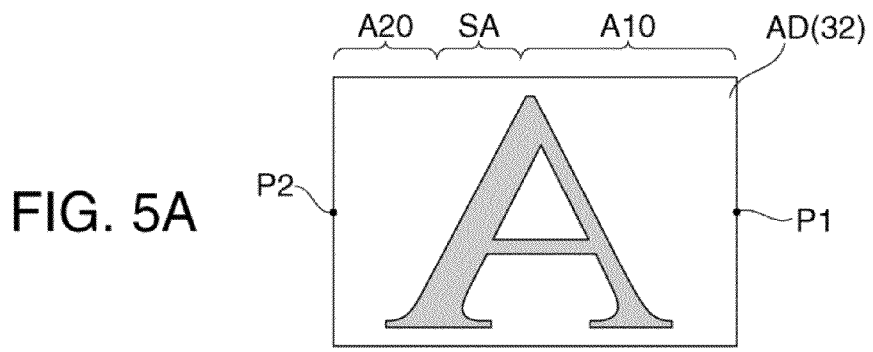
FIG. 5A shows a display surface of a liquid crystal display device.
Figure 5B:
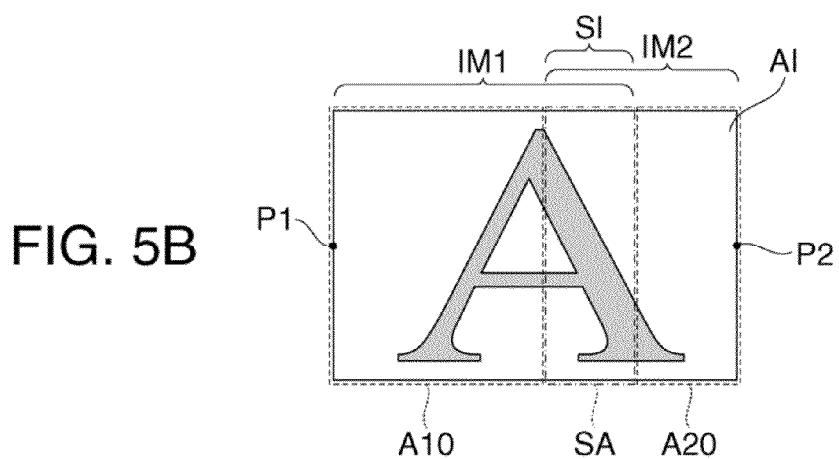
FIG. 5B is a diagram for conceptual explanation of a virtual image of the liquid crystal display device seen from an observer.
Figure 5C:
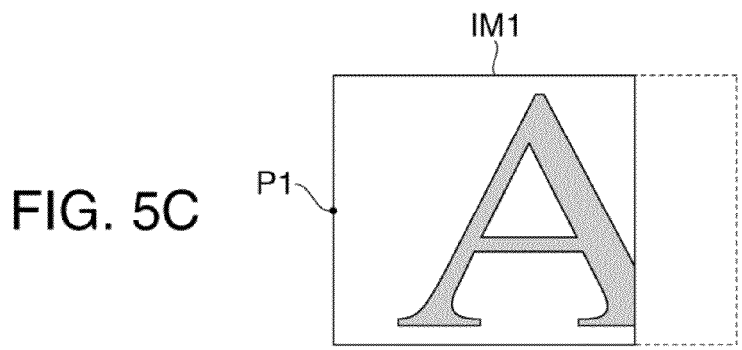
FIGS. 5C and 5D are diagrams for explanation of partial images forming the virtual image.
Figure 5D:
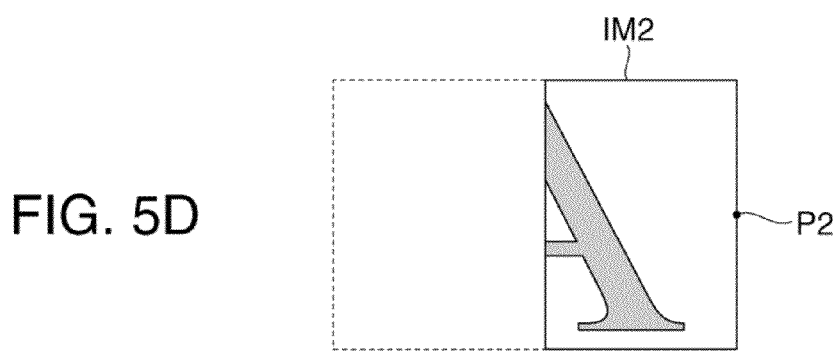
Figure 9D:
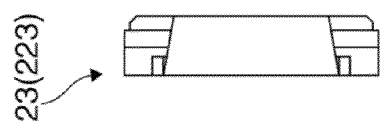
FIG. 9D is a right side view of the light transmission member.
Figure 9A:
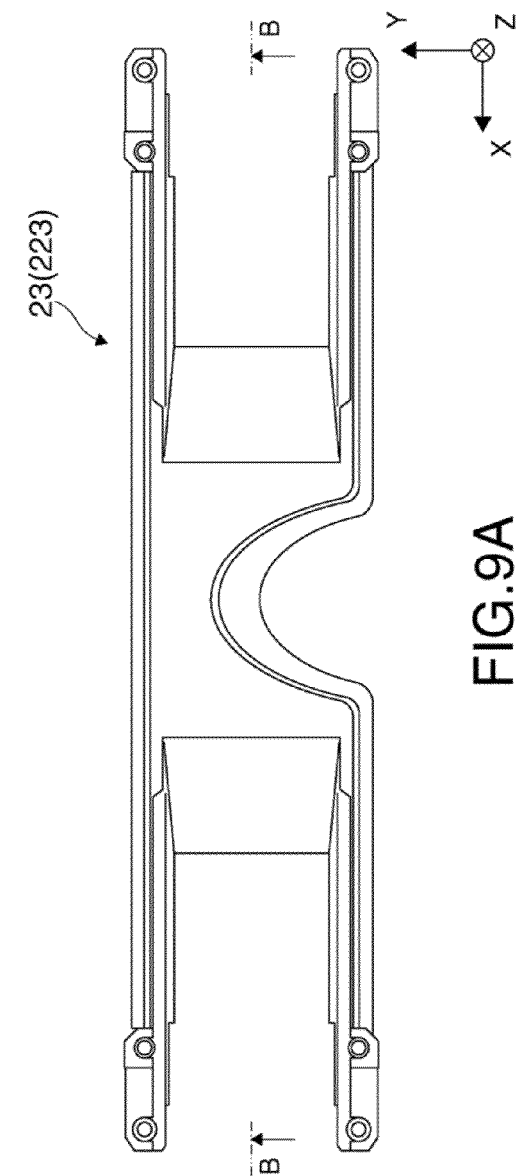
FIG. 9A is a rear view of the light transmission member.
Figure 9C:
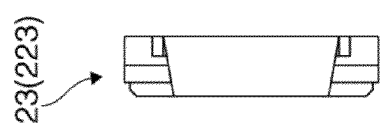
FIG. 9C is a left side view of the light transmission member.
Figure 9B:
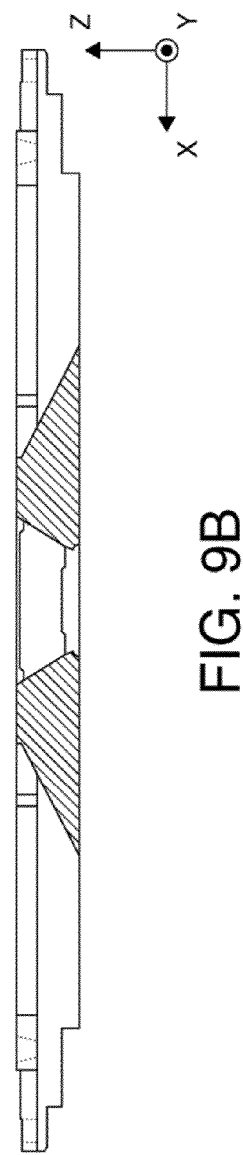
FIG. 9B is a sectional view along BB of the light transmission member.

FIG. 5A is a diagram for conceptual explanation of the display surface of the liquid crystal display device 32, FIG. 5B is a diagram for conceptual explanation of a virtual image of the liquid crystal display device 32 seen from the observer, and FIGS. 5C and 5D are diagrams for explanation of partial images forming the virtual image. A rectangular image formation area AD provided in the liquid crystal display device 32 shown in FIG. 5A is observed as a virtual display area AI shown in FIG. 5B. On the left of the virtual display area AI, a first projection image IM1 corresponding to the part from the center to the right side of the image formation area AD of the liquid crystal display device 32 is formed and the first projection image IM1 is a partial image without the right side as shown in FIG. 5C. Further, on the right of the virtual display area AI, a projection image IM2 corresponding to the part from the center to the left side of the image formation area AD of the liquid crystal display device 32 is formed as a virtual image and the second projection image IM2 is a partial image without the left side as shown in FIG. 5D.

Of the liquid crystal display device 32 shown in FIG. 5A, a first partial area A10 that forms only the first projection image (virtual image) IM1 contains the first display point P1 on the right end of the liquid crystal display device 32, for example, and outputs the image lights GL11, GL12 to be totally reflected at three times in total in the light guide part B2 of the light guide member 21. Of the liquid crystal display device 32, a second partial area A20 that forms only the second projection image (virtual image) IM2 contains the second display point P2 on the left end of the liquid crystal display device 32, for example, and outputs the image lights GL21, GL22 to be totally reflected at five times in total in the light guide part B2 of the light guide member 21. The image light from a band SA sandwiched between the first and second partial areas A10, A20 and extending longitudinally near the center of the image formation area AD of the liquid crystal display device 32 forms an overlapping image SI as shown in FIG. 5B. That is, the image light from the band SA of the liquid crystal display device 32 is brought into the first projection image IM1 formed by the image lights GL11, GL12 totally reflected at three times in total in the light guide part B2 and the second projection image IM2 formed by the image lights GL11, GL12 totally reflected at five times in total in the light guide part B2, and the images are superimposed on the virtual display area AI. When the processing of the light guide member 21 is precise and the accurately collimated luminous fluxes are formed by the projection system 12, misalignment and blurring due to superimposition of the two projection images IM1, IM2 may be prevented in the overlapping image SI.

In the above description, the number of times of total reflection of the image lights GL11, GL12 output from the first partial area A10 containing the first display point P1 on the right of the liquid crystal display device 32 by the first and second reflection surfaces 21a, 21b has been three in total and the number of times of total reflection of the image lights GL21, GL22 output from the second partial area A20 containing the second display point P2 on the left of the liquid crystal display device 32 by the first and second reflection surfaces 21a, 21b has been five in total, however, the number of times of total reflection may be appropriately changed. That is, by adjustment of the outer shape of the light guide member 21 (i.e., the thickness t, the distance D, the acute angles α, β), the number of times of total reflection of the image lights GL11, GL12 may be five in total and the number of times of total reflection of the image lights GL21, GL22 may be seven in total. Further, in the above description, the numbers of times of total reflection of the image lights GL11, GL12, GL21, GL22 have been odd numbers, however, if the light-incident surface IS and the light-exiting surface OS are located at the opposite sides, i.e., the light guide member 21 is formed in a parallelogram shape in the plan view, the numbers of times of total reflection of the image lights GL11, GL12, GL21, GL22 are even numbers.

E. Fabrication Steps of Virtual Image Display Device

As below, fabrication steps of the virtual image display device according to the embodiment will be explained using FIGS. 6A to 6F. Here, fabrication steps of the light guiding unit 20 before and after bonding of the light guide member 21 and the light transmission member 23 as characteristic parts of the respective manufacturing steps will be explained. FIG. 6A is a sectional view showing a structure of the light guiding unit 20 manufactured through the respective steps, and FIGS. 6B to 6F show the respective steps for fabrication of the structure in FIG. 6A.

First, as shown in FIG. 6B, the light guide main body part 20a forming the light-incident part B1, the light guide part B2, and the light-exiting part B3 of the light guide member 21 is prepared. The light guide main body part 20a is formed using a resin material exhibiting high light-transmissivity in the visible range, and here, is molded by injection molding using methacrylate styrene or the like as a material, for example. The light guide main body part 20a has first to fourth surfaces SFa, SFb, SFc, SFd as parts in which the first to fourth reflection surfaces 21a, 21b, 21c, 21d of the light guide member 21 (see FIG. 6A, etc.) are to be formed.

Then, as shown in FIG. 6C, of the surfaces SFa, SFb, SFc, SFd of the light guide main body part 20a, on the surface of the fourth surface SFd as the slope RR, the half mirror layer 28 is deposited by evaporation of silver or the like in regions necessary for reflection of image light and transmission of external light, and the fourth reflection surface 21d as a semi-transmissive surface is formed (reflection part fabrication step).

Then, as shown in FIG. 6D, the light transmission main body part 24a to be the light transmission member 23 bonded to the light guide main body part 20a to be the light guide member 21 is prepared. The light transmission main body part 24a has first and second flat surfaces MFa, MFb in which the first and second surfaces 23a, 23b of the light guide member 21 (see FIG. 6A etc.) are to be formed. Further, the light transmission main body part 24a has the third surface 23c as an opposite surface opposed to the fourth reflection surface 21d of the light guide main body part 20a.

Then, as shown in FIG. 6E, the third surface 23c of the light transmission main body part 24a to be the light transmission member 23 is bonded to the fourth reflection surface 21d of the light guide main body part 20a to be the light guide member 21 using an adhesive or the like, and they are bonded (bonding step). From a different point of view, the half mirror layer 28 of the fourth reflection surface 21d is coated with the light transmission main body part 24a as a coating member (coating step).

Then, as shown in FIG. 6F, the hard coating layers CC as surface coating layers are deposited on the exposed entire surfaces of the light guide main body part 20a and the light transmission main body part 24a in the bonded state. The hard coating layers CC are formed (hard coating layer deposition step) in a nearly uniform thickness on the entire surfaces of the light guide main body part 20a and the light transmission main body part 24a by applying a coating material using dipping processing (dipping processing step), for example. Thereby, the first and second surfaces SFa, SFb of the light guide main body part 20a are covered and the first and second surfaces 21a, 21b are formed. Further, by evaporation of aluminum or the like on the hard coating layers CC on the third surface SFc as the slope RS, the mirror layer 25 as a mirror film is deposited and the third reflection surface 21c is formed (mirror layer deposition step). In this manner, the light guide member 21 with the hard coating layer CC and the mirror layer 25 deposited in the light guide main body part 20a and the light transmission member 23 with the hard coating layer CC deposited in the light transmission main body part 24a are integrally fabricated. Here, if dirt or the like attaches to the surfaces of the light guide main body part 20a and the light transmission main body part 24a in the deposition of the hard coating layers CC, the layers may not fulfill the function as hard coating such as prevention from damage and facilitation of removal of soiling. Accordingly, cleansing of the surface parts of the light guide main body part 20a and the light transmission main body part 24a is performed as pre-processing of deposition. In this regard, the half mirror layer 28 is covered by the light transmission main body part 24a as the coating member, and thus, situations such that the half mirror layer 28 is separated thereby or cracked due to cleansing or subjected to chemical effect by the cleansing agent may be avoided. Note that, the formation of the mirror layer 25 is performed after deposition of the hard coating layers CC, and thus, the layer may be deposited in good condition without influence by cleansing at deposition of the hard coating layers CC or the like.

In the above described manner, the light guiding unit 20 having the structure shown in FIG. 6A is fabricated (light guiding unit fabrication step). Further, an antireflection coating AR may be deposited after the mirror layer deposition step according to need. Note that the mirror layer 25 is protected using the frame 121 (see FIG. 1), for example, as a protective cover.

In the above described hard coating layer deposition step, the thickness of the hard coating layers CC is desirably about 5 μm. Thereby, the thickness to the degree such that the shapes after deposition of the hard coating layers CC maintain the shapes formed by bonding of the light guide main body part 20a and the light transmission main body part 24a before deposition and the hard coating layers CC may function as hard coating of preventing the light guide main body part 20a and the light transmission main body part 24a from damage and facilitating removal of soiling is provided.

As described above, in the virtual image display device 100 according to the embodiment, the hard coating layers CC are deposited under the condition that the half mirror layer 28, the reflection film for folding light as the optical element incorporated in the light guiding unit for light guide in the fabrication of the light guiding unit 20 is covered by the light transmission main body part 24a as the coating member, i.e., the light transmission member 23. Therefore, even when the surfaces of the light guide main body part 20a and the light transmission main body part 24a to be the light guiding unit 20 are cleansed as the pre-processing of the deposition of the hard coating layers CC in the fabrication of the virtual image display device 100, for example, the situations such that the half mirror layer 28 is separated thereby may be avoided and the optical properties of the half mirror layer 28 may not be lost. In this manner, in the virtual image display device 100, the hard coating layers CC are provided and damage may be suppressed and soiling on the surfaces may be removed, and the optical properties of the half mirror layer 28 may be maintained in good condition. Especially, in the above described case, the coating member is the light transmission member 23 having light transmissivity, and see-through observation in good condition may be performed.

Further, in the above description, the reflection part for folding light has been covered by the coating member at the light-exiting part side, however, the reflection part for folding light may be covered by the coating member at the light-incident part side, not limited to that. Specifically, in the above description, the reflection part for folding light has been used as the half mirror layer 28 at the light-exiting part B3 side, and the light transmission main body part 24a, i.e., the light transmission member 23 has been used as the coating member and the half mirror layer 28 has been covered and protected by the light transmission member 23, however, the embodiment is not limited to that. For example, at the light-incident part B1 side, the mirror layer 25 as the mirror film is the reflection part for folding light that folds image light. That is, the hard coating layers CC may be deposited under the condition that the reflection part for folding light is used as the mirror layer 25, the mirror layer 25 is deposited on the third surface SFc in FIG. 6C, and the coating member for coating the mirror layer 25 is separately provided. To protect the mirror layer 25, transmission of image light in good condition may be performed.

Further, in the case where no antireflection coating AR is provided on the light guide member 21 of the light guiding unit 20 fabricated in the above described manner, the first and second reflection surfaces 21a, 21b are formed by the interfaces between the hard coating layers CC located at the outermost layers and the air layers (see FIG. 6F). Furthermore, the third reflection surface 21c is formed by the interface between the mirror layer 25 and the third surface SFc (see FIG. 6A). In addition, the fourth reflection surface 21d is formed by the interface between the half mirror layer 28 and the fourth surface SFd (see FIG. 6A). Note that, as shown in FIG. 6A, in the case where the antireflection coating AR is deposited, the interfaces between the antireflection coatings AR and the air layers may be the first and second reflection surfaces 21a, 21b.

Note that the total reflection on the first and second reflection surfaces 21a, 21b depends on the setting of the refractive index of the hard coating layers CC, and, as described above, may be produced at the interfaces between the hard coating layers CC and the air layers, i.e., at the surface side of the hard coating layers CC, however, may be produced on the surfaces SFa, SFb inside of the hard coating layers CC. That is, the surfaces that substantially function as the first and second reflection surfaces 21a, 21b may be the surfaces SFa, SFb or the surfaces of the hard coating layers CC. Whichever surfaces are the first and second reflection surfaces 21a, 21b as the surfaces that contribute to light guide of image light in the light guide part B2, the hard coating layers CC protect the first and second reflection surfaces 21a, 21b.

Second Embodiment

As below, fabrication steps of a virtual image display device according to the second embodiment using FIGS. 7A to 7F will be explained, and thereby, the virtual image display device of the embodiment will be explained. Note that the virtual image display device 200 of the embodiment is a modified example of the virtual image display device 100 of the first embodiment and the parts or items without particular explanation are the same as those of the first embodiment, and illustration and explanation will be omitted for others than the structure of a light guiding unit 220 forming the virtual image display device 200. FIG. 1A is a sectional view showing the structure of the light guiding unit 220 manufactured through the respective steps, and FIGS. 7B to 7F show the respective steps for fabrication of the structure in FIG. 7A.

First, as shown in FIG. 7B, the light guide main body part 20a to be a light guide member 221 is prepared. As shown in FIG. 7C, a hard coating layer CC1 as a surface coating layer is deposited on the exposed entire surface of the light guide main body part 20a by dipping processing, for example (hard coating layer deposition step). Thereby, the first and second surfaces SFa, SFb of the light guide main body part 20a are covered and the first and second reflection surfaces 21a, 21b are formed.

Then, as shown in FIG. 7D, on the surface of the fourth surface SFd as the slope RR, the half mirror layer 28 as the semi-transmissive reflection film is deposited on the hard coating layer CC1 and the fourth reflection surface 21d is formed (reflection part fabrication step), and the mirror film 25 is deposited on the hard coating layer CC1 on the third surface SFc as the slope RS and the third reflection surface 21c is formed (reflection part fabrication step). In this manner, the light guide member 221 is fabricated (light guide member preparation step).

Then, as shown in FIG. 7E, a light transmission member 223 to be bonded to the light guide member 221 is prepared (light transmission member preparation step). On the light transmission member 223, a hard coating layer CC2 is formed by deposition in the light transmission main body part 24a using dipping processing, for example. The hard coating layer CC2 is formed using the same material as that of the hard coating layer CC1. Note that the third surface 23c (opposite surface) is opposed to the fourth reflection surface 21d of the light guide member 221.

Then, as shown in FIG. 7F, the light transmission member 223 is bonded to the light guide member 221 using an adhesive or the like, and they are bonded (bonding step). In this case, of the hard coating layer CC1, the part as a foundation of the fourth reflection surface 21d becomes an intermediate layer existing at the inner side of the device when the light transmission member 223 is bonded. Of the hard coating layer CC1, the parts covering the first and second surfaces SFa, SFb are surface coating layers forming the exposed surfaces.

In the above described manner, the light guide unit 120 having the structure shown in FIG. 7A is fabricated (light guiding unit fabrication step). Further, an antireflection coating AR may be deposited after the bonding step according to need. Note that the mirror layer 25 is protected using the frame 121 (see FIG. 1), for example, as a protective cover.

In the embodiment, in the fabrication of the light guide unit 220, the hard coating layer CC1 forming the light guide member 221 is deposited, and then, the mirror layer 25 and the half mirror layer 28 as the reflection part for folding light are formed. Therefore, even when the surface of the light guide main body part 20a to be the light guiding unit is cleansed as the pre-processing of the deposition of the hard coating layer CC1 in the fabrication of the virtual image display device 200, for example, the situations such that the mirror layer 25 and the half mirror layer 28 are separated thereby may be avoided and the optical properties of the mirror layer 25 and the half mirror layer 28 may not be lost. In this manner, in the virtual image display device 200, the hard coating layer CC1 and the hard coating layer CC2 are provided and damage may be suppressed and soiling on the surfaces may be removed, and the optical properties of the half mirror layer 28 may be maintained in good condition. Especially, in the above described case, the light transmission member 223 has light transmissivity, and see-through observation in good condition may be performed.

Further, in the embodiment, the bonded part is formed by the hard coating layers CC1, CC2 formed using the same material, and sufficient adhesion strength may be secured using an adhesive suitable for bonding of the material. Therefore, as the material of the light guide main body part 20a of the light guide member 221 and the light transmission main body part 24a of the light transmission member 223, a cycloolefin polymer, which is generally difficult to be directly bonded, may be used. In the case of using the cycloolefin polymer, high light transmissivity may be provided to the light guide member 221 and the light transmission member 223, hygroscopicity may be particularly suppressed, and see-through observation in better condition may be performed. Further, in this case, the sufficient adhesive strength may be secured using different materials for the light guide main body part 20a and the light transmission main body part 24a.

F. Others

The invention has been explained according to the embodiments, however, the invention is not limited to the above described embodiments and may be implemented in various forms without departing from the scope of the invention. For example, the following modifications may be made.

In the above described embodiment, the virtual image display device 100 has been explained as a see-through type, however, the invention may be applied to a head-mounted display, not the see-through type.

The shapes of the light transmission members 23, 223 are not limited to those formed by extending the light guide members 21, 221 laterally, i.e., in the X direction, but may contain the parts formed by expansion to vertically sandwich the light guide members 21, 221. For example, there are conceivable combinations of the light guide members 21, 221 and the light transmission members 23, 223 as shown in FIGS. 8A to 8D and FIGS. 9A to 9B. Note that, even when the light guide members 21, 221 and the light transmission members 23, 223 have the relatively complex shapes, by deposition of the hard coating layers CC, CC1, CC2 using dipping processing, for example, thinner films may be uniformly deposited on the entire members. The deposition method of the hard coating layers CC, CC1, CC2 is not limited to the dipping processing, but a typical coating method, splaying method, roll coating method, wet and dry coating methods, or the like may be applied. In the case where the shapes of the light guide member 21 etc. are simpler, the hard coating layers CC, CC1, CC2 having desired thicknesses may be formed using the various methods.

Figure 10:
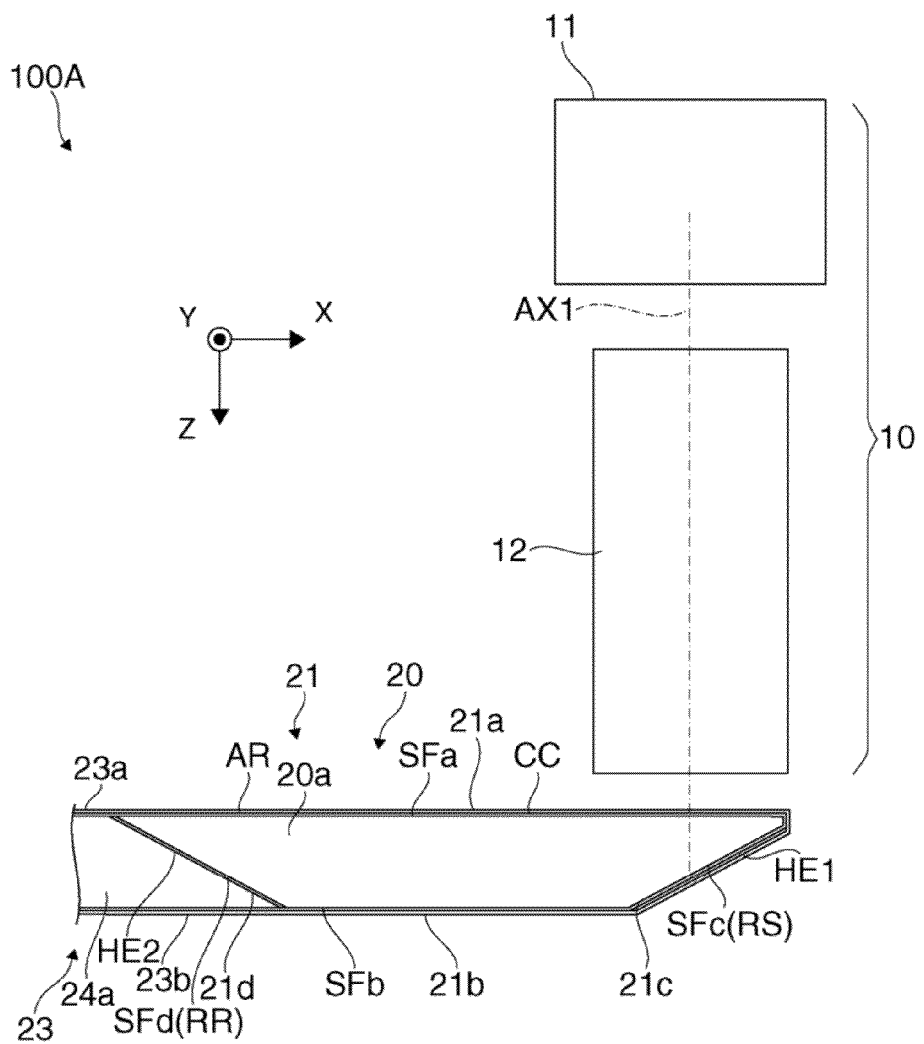
FIG. 10 shows a modified example of the first display unit forming the virtual image display device of the first embodiment.
Figure 11A:
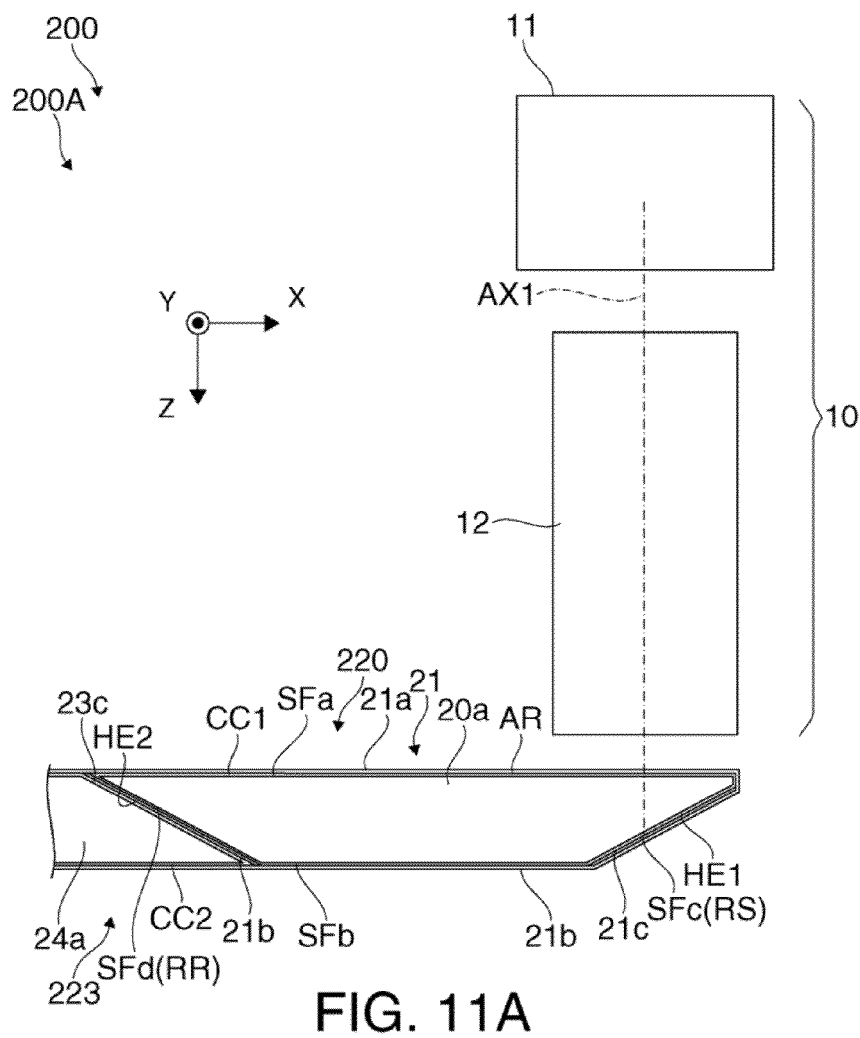
FIG. 11A shows a modified example of the first display unit forming the virtual image display device of the second embodiment.
Figure 11B:
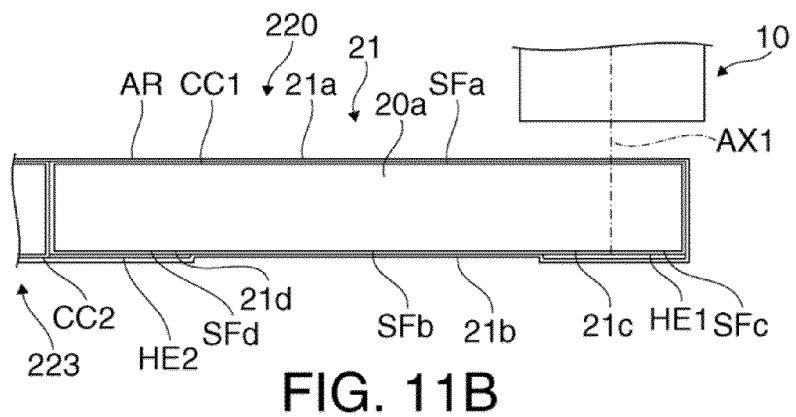
FIG. 11B shows another modified example of the first display unit.
Figure 12:
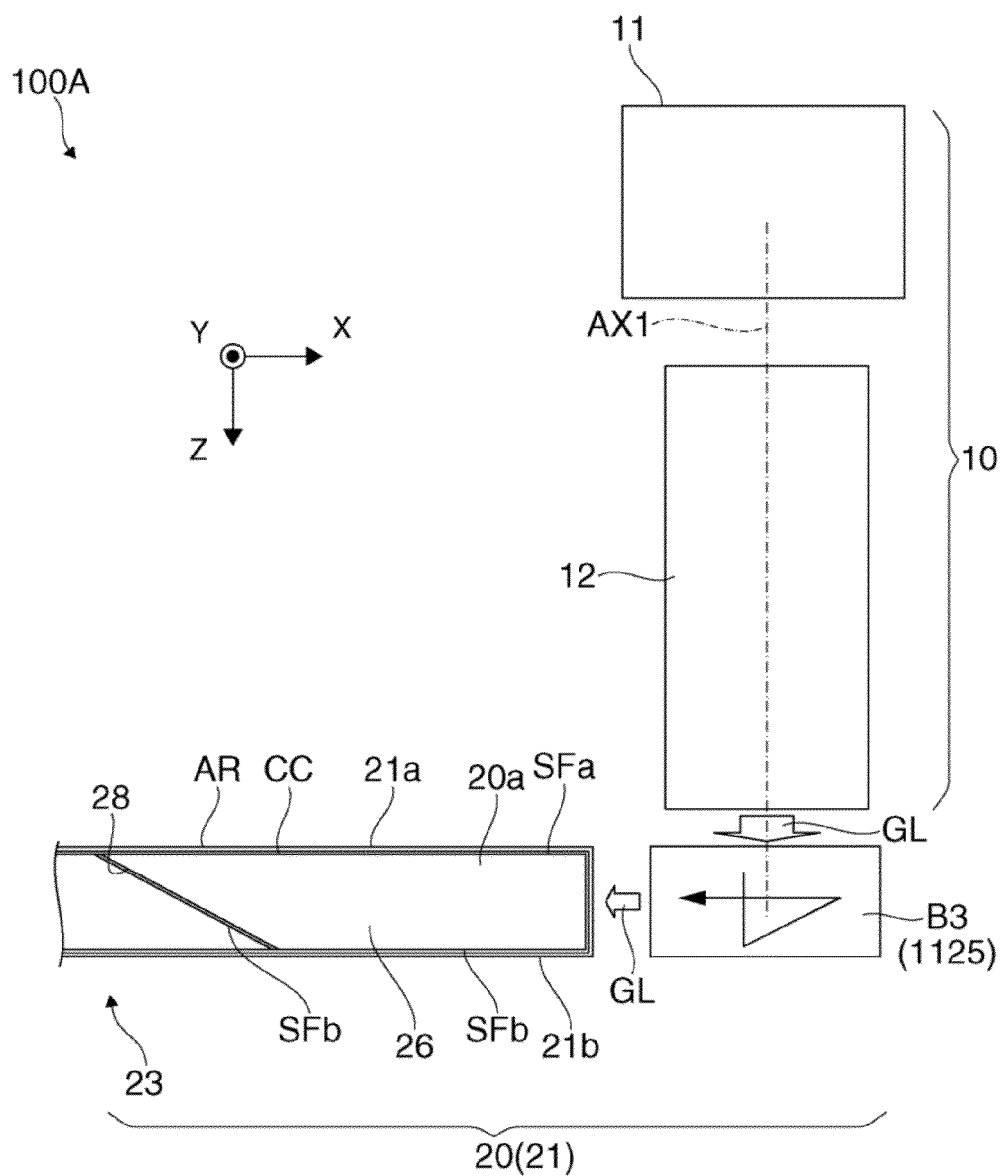
FIG. 12 shows yet another modified example of the first display unit forming the virtual image display device of the first embodiment.

In the embodiments, the half mirror layer 28 as the semi-transmissive reflection part has been the semi-transmissive reflection film formed by deposition of a metal reflection film of silver or the like and a dielectric multilayer film, however, the semi-transmissive reflection part may be formed by a semi-transmissive member having semi-transmissive reflectivity, a semi-transmissive sheet, or the like, not limited thereto. Further, as shown in FIGS. 10 and 11A, for example, in the first display units 100A, 200A, the third reflection surface 21c and the fourth reflection surface 21d may be formed by hologram elements HE1, HE2 in place of the mirror layer 25 and the half mirror layer 28 (see FIG. 2A, etc.). That is, the semi-transmissive reflection part that folds image light and transmits external light may be formed by the hologram element HE2. In this case, the image display unit 11 has an LED light source that generates luminous fluxes of three colors, for example, as a light source, and the hologram elements HE1, HE2 have hologram layers having three-layer structures in response to the three colors. Thereby, the hologram elements HE1, HE2 have a function of reflecting the respective color lights from the image display unit 11 in desired directions as virtual mirrors formed near the third reflection surface 21c and the fourth reflection surface 21d. That is, the hologram elements HE1, HE2 can adjust the reflection directions of the image lights. Further, in the case of using the hologram elements HE1, HE2, the respective color lights may be reflected in the desired directions. Therefore, as shown in FIG. 11B, for example, as a modified example of the first display unit 200A, the third and fourth reflection surfaces 21c, 21d are not tilted with respect to the first reflection surface 21a, but the hologram elements HE1, HE2 may be formed on a surface as the extension of the second reflection surface 21b in parallel to the first reflection surface 21a. Note that the hologram element HE2 acts only on light in a specific wavelength range and transmits light in other wavelength ranges, and thus, may pass external light and enable see-through observation.

Figure 2B:
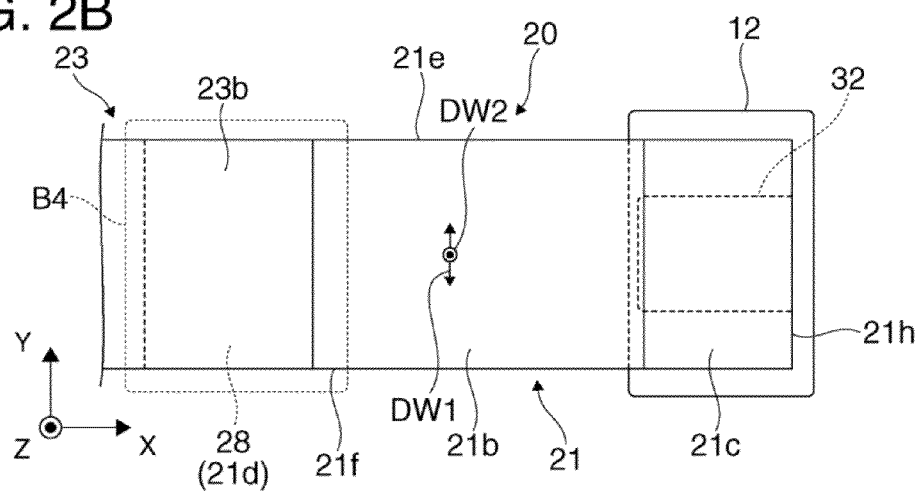
FIG. 2B is a front view of the main body part.

In the above explanation, the light guiding unit 20 having the light-incident part B1, the light guide part B2, and the light-exiting part B3 has been used, however, it is not necessary to use a planar mirror in the light-incident part B1 and the light-exiting part B3, but a function as a lens may be provided by a spherical or aspheric curved mirror. Further, as shown in FIGS. 1 and 2, a relay member 1125 having a prism shape or block shape separated from the light guide part B2 may be used as the light-incident part B1, and a function as a lens may be provided for an incident and exit surface and a reflection inner face of the relay member 1125. Note that, though the first and second reflection surfaces 21a, 21b as the first and second surfaces that propagate the image light GL by reflection are provided on a conductor 26 forming the light guide part B2, however, these reflection surfaces 21a, 21b are not necessarily in parallel to each other, but may be curved surfaces. Here, even the curved surfaces extending nearly along each other may be treated as surfaces extending oppositely to each other.

In the embodiments, directionality has not been particularly provided to the illumination light SL from the illumination device 31, however, directionality in response to the position of the liquid crystal display device 32 may be provided to the illumination light SL. Thereby, the liquid crystal display device 32 may be efficiently illuminated and brightness irregularities depending on the position of the image light GL may be reduced.

In the embodiments, the display brightness of the liquid crystal display device 32 has not particularly been adjusted, however, display brightness may be adjusted in response to the ranges and overlapping of the projection images IM1, IM2 as shown in FIG. 5B or the like.

In the embodiments, the transmissive liquid crystal display device 32 or the like has been used as the image display unit 11, however, various devices other than the transmissive liquid crystal display device 32 may be used as the image display unit 11. For example, a configuration using a reflective liquid crystal display device may be employed, or a digital micromirror device or the like may be employed in place of the liquid crystal display device 32. Further, a self-emitting device represented by an LED array, an OLED (organic EL), or the like may be used as the image display unit 11.

In the virtual image display device 100 of the embodiment, the image forming devices 10 and light guide units 20 have been provided in pairs in correspondence to both the right eye and the left eye, however, the image forming device 10 and light guiding unit 20 may be provided only for either of the right eye or the left eye for observation by a single eye.

In the embodiments, the first optical axis AX1 passing through the light-incident surface IS and the second optical axis AX2 passing through the light-incident surface IS have been in parallel, however, the optical axes AX1, AX2 may be made not in parallel.

In the above explanation, the specific explanation has been made with the virtual image display device 100 as the head-mounted display, however, the virtual image display device 100 may be altered to a head-up display.

In the above explanation, in the first and second reflection surfaces 21a, 21b, the image lights have been totally reflected and guided by interfaces between air and themselves without mirrors, half-mirrors, or the like formed on the surfaces, however, the total reflection in the invention includes reflection by mirror coatings or half-mirror films formed on the entire or parts of the first and second reflection surfaces 21a, 21b. For example, the case where the incident angle of the image light satisfies the total reflection condition and mirror coatings or the like are formed on the entire or parts of the first and second reflection surfaces 21a, 21b and all of the image light is substantially reflected may be included. Further, as long as image light with sufficient brightness is obtained, the entire or parts of the first and second reflection surfaces 21a, 21b may be coated with mirrors with some transmissivity.

In the above description, the light guide member 21 extends in the lateral direction in which the eyes EY are arranged, however, the light guide member 21 may extend in the longitudinal direction. In this case, the optical panels 110 are arranged in parallel not in series but side by side.

The entire disclosure of Japanese Patent Application No. 2011-201464, filed Sep. 15, 2011 is expressly incorporated by reference herein.

What is claimed is:

1. A virtual image display device comprising:
an image display unit that forms image light;
a projection system that forms a virtual image by the image light output from the image display unit; and
a light guide unit having a light-incident part that takes the image light that has passed through the projection system inside, a light guide part that guides the image light taken from the light-incident part by total reflection on first and second surfaces, and a light-exiting part that outputs the image light through the light guide part to the outside,
wherein the light guide unit has a reflection part that folds the image light at least in one of the light-incident part and the light-exiting part, a coating member that covers the reflection part, and a hard coating layer that protects the surface guiding the image light including at least the first and second surfaces, and
the hard coating layer covers at least the surface guiding the image light of an entire member containing a light guide main body part that forms at least the light-incident part, the light guide part, and the light-exiting part and the coating member coating the reflection part for folding light.

2. The virtual image display device according to claim 1, wherein the reflection part for folding light is a reflection film that is provided at the light-exiting part side, takes the image light to the outside, and transmits the external light.

3. The virtual image display device according to claim 2, wherein the coating member is a light transmission member forming a see-through part that is bonded to the light-exiting part to cover the reflection film and enable observation of external light.

4. The virtual image display device according to claim 2, wherein the light guide unit has a mirror film that is provided on the hard coating layer at the light-incident part side and guides the image light to the light guide part.

5. The virtual image display device according to claim 1, wherein the hard coating layer is formed by application of a coating material using dipping processing.

6. The virtual image display device according to claim 1, wherein the light guide part has the first surface and the second surface that are provided in parallel to each other and enable light guide by total reflection,
the light-incident part has a third surface forming a predetermined angle with respect to the first surface, and
the light-exiting part has a fourth surface forming a predetermined angle with respect to the first surface.

7. A virtual image display device comprising:
an image display unit that forms image light;
a projection system that forms a virtual image by the image light output from the image display unit; and
a light guide unit having a light-incident part that takes the image light that has passed through the projection system inside, a light guide part that guides the image light taken from the light-incident part by total reflection on first and second surfaces, and a light-exiting part that outputs the image light through the light guide part to the outside,
wherein the light guide unit has a hard coating layer that protects the surface guiding the image light including at least the first and second surfaces, and a reflection part that folds the image light at least in one of the light-incident part and the light-exiting part, and
the hard coating layer covers at least the surface guiding the image light of an entire member containing at least a light guide main body part that forms at least the light-incident part, the light guide part, and the light-exiting part, and the reflection part for folding light is formed on the hard coating layer.

8. The virtual image display device according to claim 7, wherein the reflection part for folding light is a reflection film that is provided at the light-exiting part side, takes the image light to the outside, and transmits the external light.

9. The virtual image display device according to claim 8, wherein the light guide unit has a light transmission member forming a see-through part that is bonded to the light-exiting part to enable observation of external light.

10. The virtual image display device according to claim 7, wherein the reflection part for folding light is a mirror film that is provided at the light-incident part side and guides the image light to the light guide part.

11. A manufacturing method of a virtual image display device including an image display unit that forms image light, a projection system that forms a virtual image by the image light output from the image display unit, and a light guide unit having a light-incident part that takes the image light that has passed through the projection, system inside, a light guide part that guides the image light taken from the light-incident part by total reflection on first and second surfaces, a light-exiting part that takes the image light through the light guide part to the outside, a reflection part that folds the image light at least in the light-incident part and the light-exiting part, a coating member that covers the reflection part, and a hard coating layer that protects the surface guiding the image light including at least the first and second surfaces,
the method comprising:
fabricating the reflection part for folding light in a light guide main body part that forms at least the light-incident part and the light-exiting part;
coating the reflection part fabricated in the fabricating with the coating member; and
depositing the hard coating layer that covers an entire member containing the light guide main body part that forms at least the light-incident part, the light guide part, and the light-exiting part and the coating member coating the reflection part for folding light in the coating.

12. The virtual image display device according to claim 11, wherein the depositing includes applying a coating material to be the hard coating layer by dipping processing.

13. A manufacturing method of a virtual image display device including an image display unit that forms image light, a projection system that forms a virtual image by the image light output from the image display unit, and a light guide unit having a light-incident part that takes the image light that has passed through the projection system inside, a light guide part that guides the image light taken from the light-incident part by total reflection on first and second surfaces, a light-exiting part that outputs the image light through the light guide part to the outside, a hard coating layer that protects the surface guiding the image light including at least the first and second surfaces, and a reflection part that folds the image light at least in one of the light-incident part and the light-exiting part,
the method comprising:
depositing the hard coating layer that covers an entire member containing the light guide main body part that forms at least the light-incident part, the light guide part, and the light-exiting part; and fabricating the reflection part for folding the image light that is formed on the light guide main body part forming at least one of the light-incident part and the light-exiting part of the hard coating layer deposited in the depositing.

\* \* \* \* \*